US012810176B2

(12) United States Patent
Gouge et al.

(10) Patent No.: US 12,810,176 B2
(45) Date of Patent: Nov. 24, 2026

(54) SENSOR READING CORRECTION

(71) Applicant: Aquatic Informatics ULC, Vancouver (CA)

(72) Inventors: Brian Devin Gouge, Vancouver (CA); Touraj Farahmand, Burbany (CA); Jacob Edward Patenaude, Vancouver (CA); Aranildo Rodrigues Lima, Vancouver (CA)

(73) Assignee: AQUATIC INFORMATICS ULC, Vancouver (CA)

( * ) Notice: Subject to any disclaimer, the term of this patent is extended or adjusted under 35 U.S.C. 154(b) by 702 days.

(21) Appl. No.: 18/132,320

(22) Filed: Apr. 7, 2023

(65) Prior Publication Data

US 2024/0337486 A1 Oct. 10, 2024

(51) Int. Cl.

*G06N 5/025* (2023.01)
*G05B 23/02* (2006.01)
*H04W 4/38* (2018.01)

(52) U.S. Cl.

CPC ......... *G06N 5/025* (2013.01); *G05B 23/0221* (2013.01); *G06F 2218/02* (2023.01); *H04W 4/38* (2018.02)

(58) Field of Classification Search

None
See application file for complete search history.

(56) References Cited

U.S. PATENT DOCUMENTS

| | | | | |
|---|---|---|---|---|
| 7,941,188 | B2 * | 5/2011 | Jung | H04L 67/125 455/562.1 |
| 8,364,613 | B1 * | 1/2013 | Lin | G06N 7/01 700/65 |
| 10,992,560 | B2 | 4/2021 | Leverich et al. | |
| 11,544,161 | B1 | 1/2023 | Yarlagadda et al. | |
| 11,816,321 | B1 * | 11/2023 | Li | G06F 3/04847 |
| 12,154,037 | B1 * | 11/2024 | Swartz | G06N 5/022 |
| 2008/0259919 | A1 | 10/2008 | Monga | |
| 2014/0159856 | A1 | 6/2014 | Meyer et al. | |
| 2017/0094537 | A1 | 3/2017 | Yang et al. | |
| 2017/0184416 | A1 * | 6/2017 | Kohlenberg | G01D 3/08 |
| 2019/0098035 | A1 | 3/2019 | Periaswamy et al. | |
| 2019/0138423 | A1 | 5/2019 | Agerstam et al. | |
| 2019/0204080 | A1 | 7/2019 | Adler et al. | |
| 2020/0041316 | A1 | 2/2020 | Parush Tzur et al. | |
| 2020/0055577 | A1 | 2/2020 | Shoemake et al. | |

(Continued)

FOREIGN PATENT DOCUMENTS

CN 110087207 A * 8/2019 .............. H04W 4/38

OTHER PUBLICATIONS

CN-110087207-A machine translation, downloaded 2025 (Year: 2025).*

(Continued)

*Primary Examiner* — John C Kuan
(74) *Attorney, Agent, or Firm* — Foley & Lardner LLP

(57) ABSTRACT

Disclosed are systems, methods, and devices for correcting or otherwise cleaning sensor data. Sensor readings and metadata or other information about the sensor readings can be collected, and one or more detection rules (e.g., machine learning models or other detection rules) can be automatically generated for modifying subsequent sensor data. Sensor readings can be refined or supplemented by applying applicable detection rules.

22 Claims, 12 Drawing Sheets

300

(56) References Cited

U.S. PATENT DOCUMENTS

| | | | |
|---|---|---|---|
| 2021/0019640 A1 | 1/2021 | Kim et al. |
| 2021/0357292 A1 | 11/2021 | Pickering et al. |
| 2022/0026313 A1 | 1/2022 | Straehle |
| 2022/0318667 A1 | 10/2022 | Babu Balasubramani et al. |
| 2024/0330759 A1 | 10/2024 | Jordan et al. |

OTHER PUBLICATIONS

Jeung et al., "An End-to-End System for Cleaning Sensor Data: Model-Based Approaches" Preprint submitted to Information Systems Dec. 21, 2010 (Year: 2010).*

Jones et al., "A data management and publication workflow for a large-scale, heterogeneous sensor network" Environ Monit Assess (2015) 187: 348 (Year: 2015).*

Karthik N et al., "A Trust Model for Lightweight Semantic Annotation of Sensor Data in Pervasive Environment" IEEE 2018 (Year: 2018).*

International Search Report and Written Opinion issued for PCT App No. PCT/IB2024/053318 dated Jul. 4, 2024 (10 pages).

International Search Report and Written Opinion issued for PCT App No. PCT/IB2024/053316 dated Jun. 13, 2024 (8 pages).

International Search Report and Written Opinion issued for PCT App No. PCT/IB2024/053319 dated Jul. 2, 2024 (9 pages).

Mohamed Ali Moussa, "Data gathering and anomaly detection in wireless sensors networks". Universit'e Paris-Est, Nov. 27, 2018 (Nov. 27, 2018), pp. 1-124, [online] [retrieved on Jun. 18, 2024 (Jun. 18, 2024)]. Retrieved from the Internet: <https://pastel.hal.science/tel-0I 936285/file/I1120I 7PESC I 082.pdf>.

Teh et al., "Sensor data quality: a systematic review". Journal of Big Data, Feb. 11, 2020 (Feb. 11, 2020), vol. vol. 7:11, pp. 1-49, [online] [retrieved on Jun. 18, 2024 (Jun. 18, 2024)]. Retrieved from the Internet <https://joumalofbigdata.springeropen.com/articles/1O.I 86/s40537-020-0285-1>.

Vedurmudi et al., "Semantic Description of Quality of Data in Sensor Networks". Sensors (Basel), Sep. 28, 2021 (Sep. 28, 2021 ), pp. 1-21, ISSN doi: 10.3390/s21196462 [online] [retrieved on Jun. 17, 2024 (Jun. 17, 2024)]. Retrieved from the Internet: <htt12s://www.ncbi.nlrn.nih.eov/12mc/articles/PMC8512247/>.

Non-Final Office Action on U.S. Appl. No. 18/132,325 Dtd Aug. 13, 2025.

International Preliminary Report on Patentability and Written Opinion on PCT Appl. No. PCT/IB2024/053319 mailed Oct. 16, 2025 (6 pages).

International Preliminary Report on Patentability and Written Opinion on PCT Appl. No. PCT/IB2024/053316 dated Oct. 2, 2025 (5 pages).

International Preliminary Report on Patentability and Written Opinion on PCT Appl. No. PCT/IB2024/053318 mailed Oct. 16, 2025 (7 pages).

* cited by examiner

100

300

SENSOR READING CORRECTION

TECHNICAL FIELD

The present disclosure relates generally to sensor data enhancement, and to generation of detection rules, such as machine learning models and/or heuristics, to correct or otherwise modify sensor readings and generate missing sensor readings.

BACKGROUND

Sensors provide scientists and engineers crucial data about our world, and can enable intelligent devices to better understand their surroundings and thus operate more effectively. But sensor readings are not always reliable. This is particularly the case if the sensor is not in a controlled environment, but is instead subject to changes in conditions (e.g., fluctuations in temperatures, humidity, vibrations, etc.). Relying on such sensor readings can result in a poorer understanding of circumstances and thus suboptimal decision-making.

SUMMARY

Potential embodiments relate to a method comprising: collecting, by one or more processors of a computing system, (i) first sensor data comprising a time series of data obtained from a first set of one or more sensors, and (ii) auxiliary data corresponding at least in part to the first sensor data; generating, by the one or more processors, a first set of one or more detection rules for modifying the first sensor data by analyzing at least the first sensor data and the auxiliary data; determining, by the one or more processors, that the first set of one or more detection rules is applicable to second sensor data from at least one of (i) the first set of one or more sensors or (ii) a second set of one or more sensors; and modifying, by the one or more processors, the second sensor data by applying the first set of one or more detection rules to the second sensor data to refine or supplement the second sensor data.

In various embodiments, the method comprises: receiving, by the one or more processors, via one or more input devices of one or more computing devices, at least one of (i) one or more changes to modified second sensor data, or (ii) one or more labels applied to the modified second sensor data; and modifying, by the one or more processors, the first set of one or more detection rules based on at least one of (i) the one or more changes to the modified second sensor data or (ii) the one or more labels applied to the modified second sensor data to obtain a second set of one or more detection rules. In various embodiments, the method comprises modifying, by applying the second set of one or more detection rules, at least one of (i) the modified second sensor data, or (ii) third sensor data obtained from at least one of (i) the first set of one or more sensors, (ii) the second set of one or more sensors, or (iii) a third set of one or more sensors. In various embodiments, the method comprises: presenting, by the one or more processors, via one or more output devices of one or more computing devices, the first set of one or more detection rules, wherein presenting the first set of one or more detection rules comprises presenting, by the one or more processors, via the one or more output devices of the one or more computing devices, an indication of how the second sensor data would be modified through application of the first set of one or more detection rules, and receiving, by the one or more processors, via one or more input devices of the one or more computing devices, approval of the application of the set of one or more detection rules to the second sensor data, wherein the first set of one or more detection rules is applied to modify the second sensor data in response to receiving the approval. In various embodiments, the indication includes a description, definition, summary, or representation of at least a portion of the first set of one or more detection rules. In various embodiments, the indication includes a description, definition, summary, or representation of a least a portion of the second sensor data based on application of the first set of one or more detection rules. In various embodiments, the method comprises receiving, by the one or more processors, via the one or more input devices of the one or more computing devices, a user supplied modification of the first set of one or more detection rules, and the application of the first set of one or more detection rules to modify the second sensor data includes application of the user supplied modification. In various embodiments, the modifying includes applying the first set of one or more detection rules to generate data missing for one or more points in time. In various embodiments, the auxiliary data is indicative of how the first sensor data has been modified by one or more users. In various embodiments, the auxiliary data comprises a modified time series of sensor data corresponding at least in part to the first sensor data, wherein at least a subset of the first sensor data is modified or deleted. In various embodiments, the auxiliary data comprises data from at least one sensor that is not included in the first set of one or more sensors. In various embodiments, the auxiliary data comprises at least one of (i) one or more labels applied to the first sensor data, or (ii) metadata corresponding at least in part to the first sensor data. In various embodiments, analyzing the first sensor data and the auxiliary data comprises: selecting, by the one or more processors, based at least in part on the auxiliary data, a subset of the first sensor data; and determining, by the one or more processors, one or more classes of modifications made to the subset of the first sensor data. In various embodiments, generating the first set of one or more detection rules comprises formulating an expression according to the one or more classes of modifications. In various embodiments, the subset of the first sensor data is selected based at least in part on one or more characteristics of one or more sensors of the first set of one or more sensors. In various embodiments, the one or more characteristics corresponds to one or more locations of the first set of one or more sensors. In various embodiments, the one or more characteristics correspond to a body of water from which sensor readings are collected using one or more sensors. In various embodiments, the first set of one or more detection rules comprises a plurality of detection rules, and generating the first set of one or more detection rules comprises generating a sequential order in which the plurality of detection rules are to be applied to sensor data. In various embodiments, the sequential order is based on at least one of an attribute or an action of each of the plurality of detection rules. In various embodiments, the method further comprises applying the plurality of detection rules to the second sensor data according to the sequential order.

Other potential embodiments relate to a computing system comprising one or more processing circuits configured to: collect (i) first sensor data comprising a time series of data obtained from a first set of one or more sensors, and (ii) auxiliary data corresponding at least in part to the first sensor data; generate a first set of one or more detection rules for modifying the first sensor data by analyzing at least the first sensor data and the auxiliary data; determine that the first set of one or more detection rules is applicable to second sensor data from at least one of (i) the first set of one or more sensors or (ii) a second set of one or more sensors; and modify the second sensor data by applying the first set of one or more detection rules to the second sensor data to refine or supplement the second sensor data.

In various embodiments, the one or more processing circuits configured to: receive, via one or more input devices of one or more computing devices, at least one of (i) one or more changes to the modified second sensor data, or (ii) one or more labels applied to the modified second sensor data; and modify, by the one or more processors, the first set of detection rules based on at least one of (i) the one or more changes to the modified second sensor data or (ii) the one or more labels applied to the modified sensor data to obtain a second set of one or more detection rules. In various embodiments, analyzing at least the first sensor data and the auxiliary data comprises: selecting, based at least in part on the auxiliary data, a subset of the first sensor data; and determining, by the one or more processors, one or more classes of modifications made to the subset of the first sensor data.

Other potential embodiments relate to a method comprising: collecting, by one or more processors of a computing system, first sensor data comprising a time series of data obtained from a first set of one or more sensors; generating or identifying, by the one or more processors, one or more detection rules applicable to the first sensor data, for refining or supplementing the first sensor data, by analyzing at least a portion of the first sensor data; presenting, by the one or more processors, via one or more output devices of one or more computing devices, an indication of how at least a portion of the first sensor data would be refined or supplemented through application of the one or more detection rules; receiving, by the one or more processors, via one or more input devices of the one or more computing devices, approval of the application of the one or more detection rules to the first sensor data; and applying, by the one or more processors, the one or more detection rules to the first sensor data to refine or supplement the first sensor data.

In various embodiments, the method comprises collecting, by the one or more processors, auxiliary data corresponding at least in part to the first sensor data, wherein the one or more detection rules are generated based at least on the auxiliary data by: selecting, by the one or more processors, based on the auxiliary data, a subset of the first sensor data; and determining, by the one or more processors, one or more classes of modifications made to the subset of the first sensor data. In various embodiments, generating the one or more detection rules comprises formulating, by the one or more processors, an expression according to the one or more classes of modifications. In various embodiments, the subset of the first sensor data is selected based on one or more characteristics of one or more of the set of one or more sensors from which the first sensor data was obtained. In various embodiments, the one or more characteristics corresponds to one or more locations of the one or more of the set of one or more sensors from which the first sensor data was obtained. In various embodiments, the one or more characteristics correspond to one or more bodies of water from which sensor readings are collected using the set of one or more sensors from which the first sensor data was obtained. In various embodiments, the set of one or more sensors detect conditions of the one or more bodies of water. In various embodiments, the method comprises collecting, by the one or more processors, a set of metadata corresponding to the first sensor data. In various embodiments, the one or more detection rules are further generated based on the set of metadata. In various embodiments, the method comprises collecting, by the one or more processors, auxiliary data comprising a transformation of at least part of the first sensor data. In various embodiments, the method comprises collecting, by the one or more processors, auxiliary data comprising a modified time series of sensor data corresponding at least in part to the first sensor data, wherein at least a subset of the first sensor data is modified or deleted. In various embodiments, the auxiliary data is indicative of changes made to the first sensor data. In various embodiments, the auxiliary data comprises data from at least one sensor that is not included in the first set of one or more sensors. In various embodiments, the indication includes a description, definition, summary, or representation of at least a portion of the one or more the detection rules. In various embodiments, the indication includes a description, definition, summary, or representation of a least a portion of the second sensor data based on application of the one or more detection rules. In various embodiments, the method comprises receiving, by the one or more processors, via one or more input devices of the one or more computing devices, a user supplied modification of the one or more detection rules, and the application of the one or more detection rules to modify the second sensor data includes application of the user supplied modification. In various embodiments, applying the one or more detection rules generates data missing from the first sensor data for one or more points in time. In various embodiments, the method comprises receiving, by the one or more processors, via one or more input devices of the one or more computing devices, at least one of (i) one or more modifications to the first sensor data, or (ii) one or more labels applied to the first sensor data. In various embodiments, the method comprises generating, by the one or more processors, one or more detection rules based on at least one of (i) the one or more modifications to the first sensor data or (ii) the one or more labels applied to the first sensor data. In various embodiments, the method comprises collecting, by the one or more processors, second sensor data obtained from the first set of one or more sensors or a second set of one or more sensors. In various embodiments, the method comprises presenting, by the one or more processors, via one or more output devices of one or more computing devices, an indication of how the second sensor data would be at least one of modified or labeled through application of the one or more detection rules. In various embodiments, the method comprises receiving, by the one or more processors, via one or more input devices of the one or more computing devices, approval of the application of the one or more detection rules to the second sensor data. In various embodiments, the method comprises applying, by the one or more processors, the one or more detection rules to the second sensor data to refine or supplement the second sensor data. In various embodiments, generating the one or more detection rules comprises: selecting, by the one or more processors, based on one or more modifications to the first sensor data or one or more labels applied to the first sensor data, a subset of the first sensor data; determining, by the one or more processors, one or more classes of modifications made to the subset of the first sensor data; and formulating, by the one or more processors, an expression according to the one or more classes of modifications. In various embodiments, the method comprises presenting, by the one or more processors, via one or more output devices of one or more computing devices, an indication of how second sensor data would be at least one of modified or labeled through application of the one or more detection rules. In various embodiments, the second sensor data is obtained from one or more sensors in at least one of the first set of one or more sensors or a second set of one or more sensors. In various embodiments, the method comprises receiving, by the one or more processors, via one or more input devices of the one or more computing devices, a user supplied modification of the set of one or more detection rules, wherein the application of the one or more detection rules to modify the second sensor data includes application of the user supplied modification. In various embodiments, generating the one or more detection rules comprises: selecting, by the one or more processors, based on one or more modifications to the first sensor data or one or more labels applied to the first sensor data, a subset of the first sensor data; and determining, by the one or more processors, one or more classes of modifications made to the subset of the first sensor data. In various embodiments, the subset of the first sensor data is selected based on one or more characteristics of the set of one or more sensors. In various embodiments, the one or more characteristics corresponds to at least one of (i) one or more locations of the first set of one or more sensors, or (ii) one or more bodies of water from which sensor readings are collected using the first set of one or more sensors. In various embodiments, applying the one or more detection rules generates data missing from the first sensor data for one or more points in time. In various embodiments, the one or more detection rules comprises a plurality of detection rules. In various embodiments, generating or identifying the plurality of detection rules comprises generating or identifying a sequential order in which the plurality of detection rules are to be applied to the first sensor data. In various embodiments, the sequential order is based on at least one of an attribute or an action of each of the plurality of detection rules. In various embodiments, the method comprises applying the plurality of detection rules to the first sensor data according to the sequential order.

Other potential embodiments relate to a computing system comprising one or more processing circuits configured to: collect (i) first sensor data comprising a time series of data obtained from a first set of one or more sensors; generate or identify one or more detection rules applicable to the first sensor data, for refining or supplementing the first sensor data, by analyzing at least a portion of the first sensor data; present, via one or more output devices of one or more computing devices, an indication of how at least a portion of the first sensor data would be modified through application of the one or more detection rules; receive, via one or more input devices of the one or more computing devices, approval of the application of the one or more detection rules to the first sensor data; and apply the one or more detection rules to the first sensor data to refine or supplement the first sensor data.

In various embodiments, the one or more processing circuits are configured to communicate with at least one of: (A) a second computing system to collect at least one of (i) the time series of first sensor data or (ii) the modification data; or (B) the set of sensors. In various embodiments, the one or more processing circuits are configured to collect auxiliary data corresponding at least in part to the first sensor data. In various embodiments, the one or more detection rules are generated further based on the auxiliary data by: selecting, by the one or more processing circuits, based on the auxiliary data, a subset of the first sensor data; and determining, by the one or more processing circuits, one or more classes of modifications made to the subset of the first sensor data.

Other potential embodiments relate to a method comprising: collecting, by one or more processors of a computing system, first sensor data comprising a time series of data obtained from a set of one or more sensors; receiving, by the one or more processors, via one or more input devices of the one or more computing devices, at least one of (i) one or more modifications to the time series of first sensor data, or (ii) one or more labels applied to the first sensor data; generating, by the one or more processors, one or more detection rules based on at least one of (i) the one or more modifications to the time series of first sensor data or (ii) the one or more labels applied to the first sensor data; collecting, by the one or more processors, second sensor data obtained from a set of one or more sensors; presenting, by the one or more processors, via one or more output devices of one or more computing devices, an indication of how the second sensor data would be at least one of modified or labeled through application of the one or more detection rules; receiving, by the one or more processors, via one or more input devices of the one or more computing devices, approval of the application of the one or more detection rules to the second sensor data; and applying, by the one or more processors, the one or more detection rules to the second sensor data to refine or supplement the second sensor data.

In various embodiments, collecting the first sensor data comprises accessing, by the one or more processors, the time series of first sensor data via at least one of (i) a second computing system or (ii) the set of one or more sensors. In various embodiments, generating the one or more detection rules comprises: selecting, by the one or more processors, based on the one or more modifications or the one or more labels, a subset of the time series of first sensor data; and determining, by the one or more processors, one or more classes of modifications made to the subset of the time series of first sensor data. In various embodiments, generating the one or more detection rules comprises formulating an expression according to the one or more classes of modifications. In various embodiments, the indication includes a description, definition, summary, or representation of a least a portion of the second sensor data based on application of the set of one or more detection rules. In various embodiments, the method comprises receiving, by the one or more processors, via one or more input devices of the one or more computing devices, a user supplied modification of the set of one or more detection rules, wherein the application of the first set of one or more detection rules to modify the second sensor data includes application of the user supplied modification. In various embodiments, the subset of the time series of first sensor data is selected based on one or more characteristics of the set of one or more sensors. In various embodiments, the one or more characteristics corresponds to one or more locations of the set of one or more sensors. In various embodiments, the one or more characteristics correspond to one or more bodies of water from which sensor readings are collected using the set of one or more sensors. In various embodiments, the method further comprises collecting a set of metadata corresponding at least in part to the first sensor data in the time series of first sensor data. In various embodiments, the one or more detection rules are further generated based on the set of metadata. In various embodiments, the one or more modifications comprise a modified time series of sensor data corresponding to the first sensor data, wherein at least a subset of the first sensor data is modified or deleted. In various embodiments, the method further comprises presenting, by the one or more processors, via the one or more output devices, a definition of the one or more the detection rules. In various embodiments, the indication includes a description, definition, summary, or representation of at least a portion of the set of one or more detection rules.

Other potential embodiments relate to a computing system comprising one or more processing circuits configured to: collect first sensor data comprising a time series of data obtained from a set of one or more sensors; receive, via one or more input devices of the one or more computing devices, at least one of (i) one or more modifications to the time series of first sensor data, or (ii) one or more labels applied to the first sensor data; generate one or more detection rules based on at least one of (i) the one or more modifications to the time series of first sensor data or (ii) the one or more labels applied to the first sensor data; collect second sensor data obtained from a set of one or more sensors; present, via one or more output devices of one or more computing devices, an indication of how the second sensor data would be at least one of modified or labeled through application of the one or more detection rules; receive, via one or more input devices of the one or more computing devices, approval of the application of the one or more detection rules to the second sensor data; and apply the one or more detection rules to the second sensor data to refine or supplement the second sensor data.

In various embodiments, the one or more processing circuits are configured to communicate with at least one of: (A) a second computing system to collect at least one of (i) the time series of first sensor data, (ii) the one or more modifications, or (iii) the one or more labels applied to the first sensor data; or (B) the set of sensors. In various embodiments, the one or more processing circuits collect the sensor data by accessing the time series of first sensor data via at least one of (i) a second computing system or (ii) the set of sensors. In various embodiments, generating the one or more detection rules comprises: selecting, based on the one or more modifications or the one or more labels, a subset of the time series of first sensor data; and determining one or more classes of modifications made to the subset of the time series of first sensor data.

Other potential embodiments relate to a method comprising: receiving, by one or more processors of a computing system, via one or more input devices of one or more computing devices, auxiliary data corresponding to a set of first modified sensor data, wherein the auxiliary data includes at least one of (i) one or more changes to the set of first modified sensor data, or (ii) one or more labels applicable to the set of first modified sensor data, the set of first modified sensor data having been obtained or created at least in part by application of a first set of one or more detection rules to a set of first sensor data from a first set of one or more sensors; generating, by the one or more processors, a second set of one or more detection rules at least in part by modifying the first set of one or more detection rules based at least in part on the auxiliary data; collecting, by the one or more processors, a set of second sensor data obtained from the first set of one or more sensors or from a second set of one or more sensors; determining, by the one or more processors, that the second set of one or more detection rules is applicable to the set of second sensor data; and modifying, by the one or more processors, the set of second sensor data by applying the second set of one or more detection rules to the set of second sensor data.

In various embodiments, the method comprises generating, by the one or more processors, the first set of one or more detection rules. In various embodiments, the first set of one or more detection rules is generated based in part on at least one of (i) first sensor data from the first set of one or more sensors, or (ii) prior sensor data from the first set of one or more sensors or from another set of one or more sensors. In various embodiments, the first set of one or more detection rules is generated based on prior auxiliary data that includes at least one of (i) one or more changes to the prior sensor data, or (ii) one or more labels applicable to the prior sensor data. In various embodiments, generating the first set of one or more detection rules comprises analyzing the prior sensor data and the prior auxiliary data by: selecting, by the one or more processors, based on the auxiliary data, a subset of the prior sensor data; and determining, by the one or more processors, one or more classes of modifications made to the subset of the prior sensor data. In various embodiments, generating the first set of detection rules comprises formulating an expression according to the one or more classes of modifications. In various embodiments, the subset of the prior sensor data is selected based on one or more characteristics of the first set of one or more sensors or the another set of one or more sensors. In various embodiments, the one or more characteristics corresponds to one or more locations of the first set of one or more sensors or the another set of one or more sensors. In various embodiments, the modifying the set of second sensor data comprises applying the second set of one or more detection rules to generate data missing for one or more points in time. In various embodiments, the modifying the set of second sensor data comprises applying the second set of one or more detection rules to refine the set of second sensor data. In various embodiments, the auxiliary data comprises metadata corresponding to the first set of modified sensor data. In various embodiments, the auxiliary data is indicative of how the first set of modified sensor data was modified by one or more users. In various embodiments, the auxiliary data comprises data from at least one sensor that is not included in either of the first set of one or more sensors or the second set of one or more sensors. In various embodiments, the method comprises presenting, by the one or more processors, via one or more output devices, the second set of one or more detection rules. In various embodiments, presenting the second set of one or more detection rules comprises presenting, by the one or more processors, via the one or more output devices of the one or more computing devices, an indication of how the first set of one or more detection rules is modified to obtain the second set of one or more detection rules. In various embodiments, presenting the second set of one or more detection rules comprises presenting, by the one or more processors, via the one or more output devices of the one or more computing devices, a description, definition, summary, or representation of at least a portion of the second set of one or more detection rules. In various embodiments, presenting the second set of one or more detection rules comprises presenting, by the one or more processors, via the one or more output devices of the one or more computing devices, an indication of how applying the second set of one or more detection rules to the set of second sensor data modifies the set of second sensor data. In various embodiments, the first set of one or more sensors and the second set of one or more sensors are sensors detecting conditions of one or more bodies of water. In various embodiments, the second set of one or more detection rules comprises a second plurality of detection rules. In various embodiments, generating the second plurality of detection rules comprises generating a second sequential order in which the second plurality of rules are to be applied to the set of second sensor data. In various embodiments, the second sequential order is based on at least one of an attribute or an action of each of the second plurality of detection rules. In various embodiments, the method further comprises applying the second plurality of detection rules to the set of second sensor data according to the second sequential order.

Other potential embodiments relate to a computing system comprising one or more processing circuits configured to: receive, via one or more input devices of one or more computing devices, auxiliary data corresponding to a set of first modified sensor data, wherein the auxiliary data includes at least one of (i) one or more changes to the set of first modified sensor data, or (ii) one or more labels applicable to the set of first modified sensor data, the set of first modified sensor data having been obtained or created at least in part by application of a first set of one or more detection rules to a set of first sensor data from a first set of one or more sensors; generate a second set of one or more detection rules at least in part by modifying the first set of one or more detection rules based at least in part on the auxiliary data; collect a set of second sensor data obtained from the first set of one or more sensors or from a second set of one or more sensors; determine that the second set of one or more detection rules is applicable to the set of second sensor data; and modify the set of second sensor data by applying the second set of one or more detection rules to the set of second sensor data.

In various embodiments, the one or more processing circuits are configured to generate the first set of one or more detection rules based in part on (i) prior sensor data from the first set of one or more sensors or from another set of one or more sensors, and (ii) prior auxiliary data that includes at least one of (i) one or more changes to the prior sensor data, or (ii) one or more labels applicable to the prior sensor data. In various embodiments, the one or more processing circuits are configured to present, via one or more output devices, the second set of one or more detection rules, wherein presenting the second set of one or more detection rules comprises at least one of: presenting, via the one or more output devices of the one or more computing devices, a first indication of how the first set of one or more detection rules is modified to obtain the second set of one or more detection rules; presenting, via the one or more output devices of the one or more computing devices, a description, definition, summary, or representation of at least a portion of the second set of one or more detection rules; or presenting, via the one or more output devices of the one or more computing devices, a second indication of how applying the second set of one or more detection rules to the set of second sensor data modifies the set of second sensor data.

Other potential embodiments relate to a method comprising: collecting, by one or more processors of a computing system, (i) first sensor data comprising a time series of data obtained from a first set of one or more sensors, and (ii) auxiliary data corresponding at least in part to the first sensor data; generating, by the one or more processors, a plurality of detection rules for modifying the first sensor data by analyzing at least the first sensor data and the auxiliary data, and a sequential order for application of the plurality of detection rules; determining, by the one or more processors, that the first set of one or more detection rules is applicable to second sensor data from at least one of (i) the first set of one or more sensors or (ii) a second set of one or more sensors; and modifying, by the one or more processors, the second sensor data by applying, according to the sequential order, the plurality of detection rules to the second sensor data to refine or supplement the second sensor data.

Other potential embodiments relate to a method comprising: collecting, by one or more processors of a computing system, first sensor data comprising a time series of data obtained from a first set of one or more sensors; generating or identifying, by the one or more processors, by analyzing at least a portion of the first sensor data, a plurality of detection rules applicable to the first sensor data and a sequential order for application of the plurality of detection rules; presenting, by the one or more processors, via one or more output devices of one or more computing devices, an indication of how at least a portion of the first sensor data would be refined or supplemented through application of the plurality of detection rules; receiving, by the one or more processors, via one or more input devices of the one or more computing devices, approval of the application of the plurality of detection rules to the first sensor data; and applying, by the one or more processors, according to the sequential order, the plurality of detection rules to the first sensor data to refine or supplement the first sensor data.

Other potential embodiments relate to a method comprising: receiving, by one or more processors of a computing system, via one or more input devices of one or more computing devices, auxiliary data corresponding to a set of first modified sensor data, wherein the auxiliary data includes at least one of (i) one or more changes to the set of first modified sensor data, or (ii) one or more labels applicable to the set of first modified sensor data, the set of first modified sensor data having been obtained or created at least in part by application of a first plurality of detection rules to a set of first sensor data from a first set of one or more sensors; generating, by the one or more processors, a second plurality of detection rules at least in part by modifying the first plurality of detection rules based at least in part on the auxiliary data; collecting, by the one or more processors, a set of second sensor data obtained from the first set of one or more sensors or from a second set of one or more sensors; determining, by the one or more processors, that the second set of one or more detection rules is applicable to the set of second sensor data; and modifying, by the one or more processors, the set of second sensor data by applying, according to a first sequential order or a second sequential order, the second plurality of detection rules to the set of second sensor data.

These and other features, together with the organization and manner of operation thereof, will become apparent from the following detailed description and the accompanying drawings.

DETAILED DESCRIPTION

Figure 1:
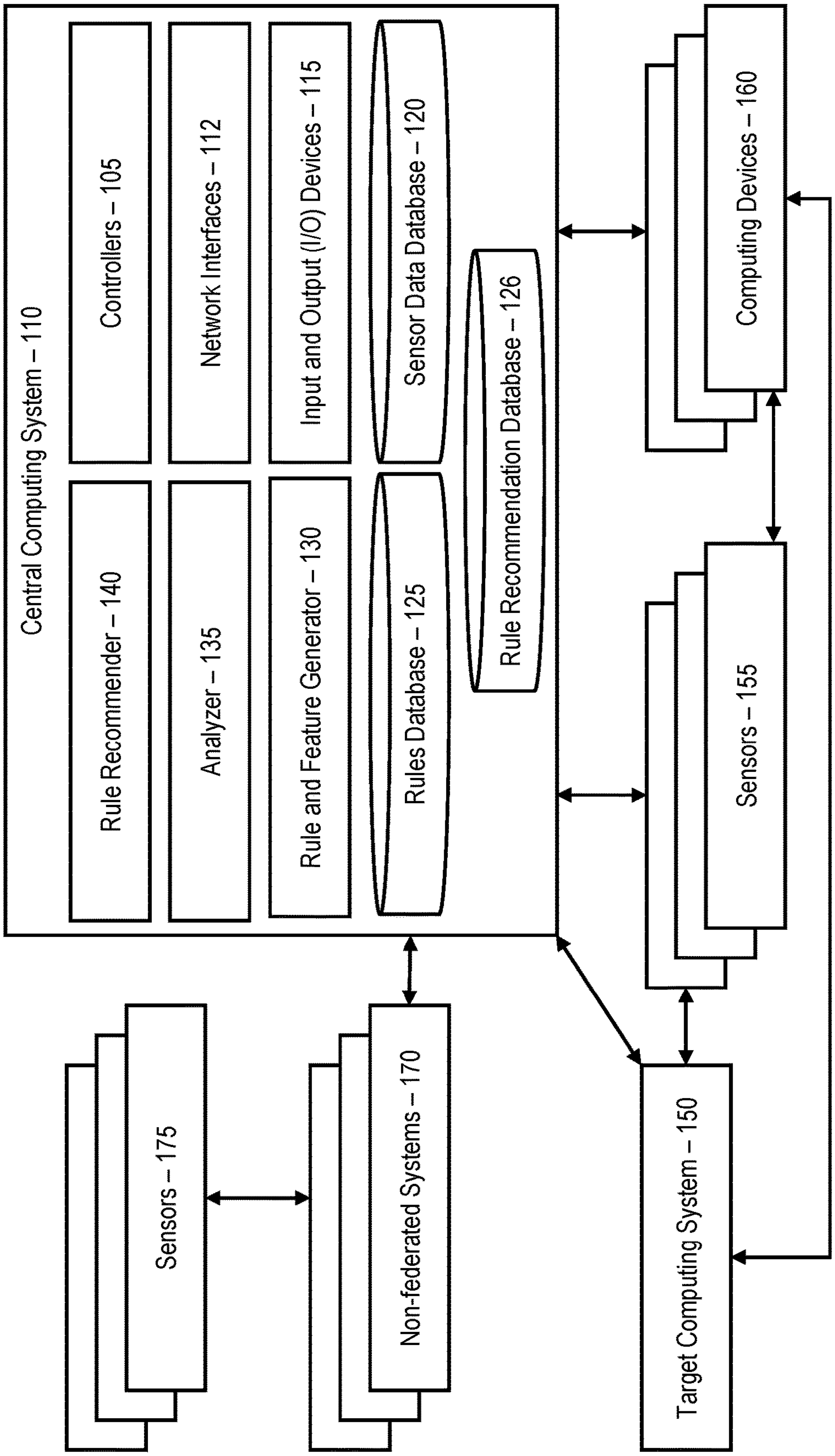
FIG. 1 is a diagram of an example system for performing potential implementations of the disclosed approach, according to some arrangements.

Data errors and missed anomalies can lead to erroneous outputs in predictive models and faulty conclusions, impacting the effectiveness, efficiency, and/or usefulness of sensor readings and the systems that rely on them. Sensor data without correction or "cleaning" can be less useful, entirely unusable, or misleading. A key driver for having clean data is to help ensure that insights and decisions made based on the data are the correct insights and decisions. Various embodiments described herein relate to systems, methods, and devices that can serve as a computational "truth serum" for sensor and other data. The disclosed approach can integrate with existing Internet of Things (IoT) and data acquisition systems. In various embodiments, the disclosed approach involves learning the true/normal behavior of sensor data measuring a phenomenon and automatically responding to data errors or anomalies through at least but not limited the following actions: 1) removing data errors, 2) labeling the data errors or anomalies, 3) correcting data errors, for example, by predicting their true value, 4) notifying users of data errors, anomalies, or other significant events. As the system learns over time, higher proportions of errors and anomalies can be identified, enhancing confidence in data-driven decisions.

The disclosed approach produces quality controlled (corrected and consistent) data that is more reliable through the application of automated quality control. Various embodiments of the disclosed approach combine existing domain knowledge, machine learning, analytics, data mining, and active learning. Initially, the system scans existing data and leverages a recommendation engine to automatically configure an initial set of detection rules to detect and correct data errors and anomalies. The system can then begin to learn each individual time series and tune these detection rules to improve performance; this can be guided by user feedback. Analytics collected about the data errors and anomalies detected and the actions of the system can be used to provide guidance and recommendations to the sensor network operators on how to maintain and optimize their sensor networks. For example, patterns in errors can help sensor network operators understand why data errors are occurring and address deficiencies in their processes and equipment, thereby preventing them from occurring in the future.

As a non-limiting example, the disclosed approach can be employed to refine time series water sensor data across the environmental and municipal domains. Such implementations will help better understand water cycles and provide insights that enhance water resource management. Water sensors may detect such parameters as turbidity, temperature, salinity, pressure, flow, dissolved oxygen, etc. in one or more bodies of water (e.g., without limitation, rivers, lakes, streams, ponds, oceans, or any other accumulations of water). Sensors may be placed at one or more bodies of water, which may be interconnected or separated from each other (e.g., not connected), with sensors that may be remote and able to communicate wirelessly. Each body of water may have one or multiple sensors. Different bodies of water may converge into and diverge from bodies of water, and tracking water conditions and changes in conditions over time is useful to understanding and maintaining the health of bodies of water. Different sensors may have different susceptibilities to error depending on such factors as the particular location of a sensor (e.g., altitude relative to sea level, depth in the water, etc.), age of sensor, temperature fluctuations between days and nights or among seasons and/or climates, how much motion or vibration the sensor experiences, etc.). Analyzing the historical readings not just from one sensor but from multiple sensors of different entities (e.g., companies, organizations, groups, etc.) enables a data-driven approach to refining data by identifying errors, generating missing data to fill in gaps in the data, etc.

The disclosed approach may employ a recommendation engine developed from an analysis of a significant volume of time series (for example, hundreds, thousands, or millions of time series), continuing to grow as more data becomes available. Embodiments of the disclosed approach can leverage field visit, lab data, and other high accuracy, but in some cases infrequent, measurements to automatically detect and correct issues in time series data. Also, the disclosed approach can help standardize data quality processes and provide insights into root causes of data errors, helping enhance current sensor and sensor network operations as well as future design, optimize sensor settings and operation, and make data collection efforts more reliable and useful.

In various embodiments, the detection rules disclosed herein may be or may comprise machine learning models. Such models may be trained using various features (e.g., sensor readings, sensor age, sensor conditions, etc.) to predict a likelihood of error. The features having the greatest influence on the likelihood of a data error varies for different sensor types. For example, the mean time between sensor calibration influences the likelihood of data errors in some water quality sensors. Similarly, such models may be trained using various features (e.g., environmental conditions, data from or about other sensors, etc.) to predict missing data points. The features having the greatest influence on the predicted values varies for different parameters being determined. For example, meteorological data including air temperature and precipitation can be used to predict missing or erroneous water temperature.

In various embodiments, sensor data can be collected, in addition to auxiliary data corresponding to the sensor data. The sensor data may be raw data, or adjusted or modified data. The auxiliary data can be metadata relating to the sensor data, or can otherwise provide supplemental information regarding the sensor data, for example what type, how, when, or by whom or by which sensor(s) the data was obtained, modified, labeled, or processed (e.g., how the data was modified by the sensor(s), various devices or computing systems, and/or by users). One or more detection rules can be generated based on an analysis of the sensor data and/or the auxiliary data. As new data is received, the approach may involve determining which detection rules are applicable to the new data (from the same or different sensors), what order they are executed in, and/or updating the detection rules based on the new data. The new data can be processed (e.g., certain data modified, deleted, or added) by applying the applicable detection rules to the new sensor data and/or the new auxiliary data to refine or supplement the new sensor data and/or the new auxiliary data.

In certain embodiments, the disclosed system can automatically set an order sequence of one or more detection rules found to be effective in the applicable domains. Once running, the system can collect analytics which will help users understand where the most pressing issues are and the system provide guidance on how to maintain and operate the sensor network. Users can add or tune or adjust the settings of a specific detection rule or detection rules. The feedback can enhance results from the system. The disclosed approach can provide a suite of rules, with a recommendation engine and an advanced data labeling tool that helps isolate key patterns and train the system to recognize the patterns that can be revealed by the system but which may be too subtle or complex for recognition or implementation by users.

Definitions

Sensor Data are measurements from a physical device of a phenomenon, for example time series data from a water temperature sensor.

Time Series Data are sequences of time-values pairs representing discrete measurements at specific points in time of a phenomenon, for example the water temperature at every hour on the hour.

Field Visits are in-situ measurements of a phenomenon made at a single point in time, typically of high confidence (precision and accuracy) especially when compared to time series data. High confidence is typically achieved by using a more sophisticated measuring device or collecting and then processing samples in a controlled laboratory environment.

Streaming Data Processing relates to processing of a continuous sequence or stream of data immediately as it is produced or received. For example, determining if there is an error in time series data received every 5 minutes. It is noted that it is generally more complex to run detection rules and other computational processes on streaming data than batch data.

Batch Data Processing relates to processing of data, typically a large volume, captured over an extended period of time all at one time as a whole. For example, determining if there is an error in a data set that consists of measurements sampled every second for one week.

Data Errors are data values that are incorrect and not equal to the true value.

(Data) Anomalies are unusual or unexpected values which may or may not be data errors.

(Data) Labelling the process of adding labels or tags to the data to provide context to learn patterns in the data (e.g., train machine learning models or generate detection rules).

Feature identifies an individual measurable property or characteristic of a phenomenon.

Detection rules are logical representations of anomalies or data errors related to detected measures or readings (e.g., sensed data from physical sensors or metadata characterizing sensed data). They may be any combination of one or more of heuristic rules that are relatively less complex, such as "sensor data values are less than 5 m," computational analytics (e.g., values outside the 95th percentile of a Gaussian distribution), and/or complex machine learning models, and may be defined in terms of time series sensor data and/or field visit data.

Analytics are the metrics and indicators that summarize activities and actions of the system as well as the data collected by the system that may be used to verify its activities and build trust in the system, provide guidance on how to better operate the system as well as the sensor networks it processes.

Data Correction is any process or method to manipulate data so that it more closely reflects the true value of the data Data Prediction is a type of data correction where by values are derived through models or other methods to estimate the true values.

Primary Sensors are sources of sensor data (e.g., measurements of a phenomen from sensors) to be cleaned, used, or otherwise recorded. Primary sensors may provide primary data, as opposed to auxiliary data, defined below.

Secondary Sensors are sensors, other than primary sensors, that may provide auxiliary data (e.g., metadata or other data that can describe, support, or put into question other sensor data) concerning primary data from one or more primary sensors.

Auxiliary Data may be any data that characterizes or qualifies other data, such as data about sensors (e.g., age of sensors) that are used to obtain readings, and/or metadata about the readings from sensors (e.g., conditions at the time a primary sensor obtained a measurement). Auxiliary data may be obtained from one or more other sensors (which may be referred to as "secondary" sensors) not included in a set of one or more sensors (which may be referred to as "primary" sensors) used to obtain readings.

Figure 2:
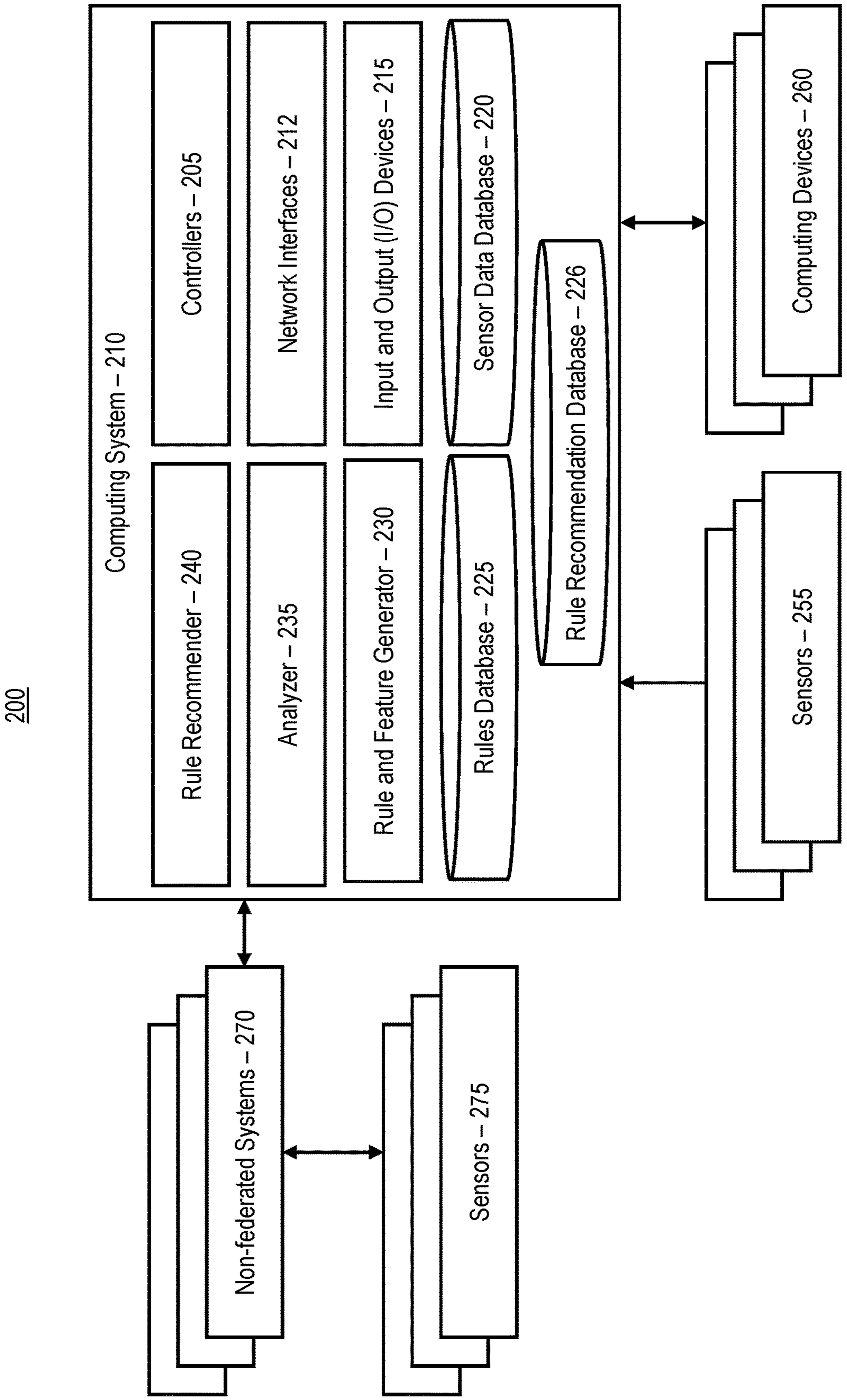
FIG. 2 is a diagram of another example system for performing potential implementations of the disclosed approach, according to some arrangements.

Referring to FIGS. 1 and 2, depicted are block diagrams of two example computer-implemented systems 100 and 200 that can be used to deploy the disclosed approach, according to various potential arrangements. The elements with like reference numerals (e.g., 100 and 200, or 110 and 210) may generally provide similar if not the same functionality, and the discussion of "1xx" elements may also be applied to "2xx") elements.

In FIG. 1, a central computing system 110 can interface with a target computing system 150, which may control or otherwise interface with one or more sensors 155 (which may be any device that detects or otherwise senses or reports parameters of its environment, and which may, or may not, be capable of wireless communication of readings and remote controllability of functions). In various embodiments, one or both of the central computing system 110 and/or the target computing system 150 may interface with one or more computing devices 160. Each sensor 155 may include circuitry and/or a transceiver suitable for collecting and/or outputting various data (e.g., wirelessly or through wired interface). A sensor 155 may comprise a global positioning system (GPS) device configured to detect a geographical location (e.g., latitude and longitude) in real or near-real time by, for example, using triangulation based on the coordinates of one or more cellular towers received via a communications circuit.

The one or more computing devices 160 may communicate with the one or more sensors 155 to collect readings, change settings, etc., and may communicate with central computing system 110 and/or target computing system 150 to provide data and commands, review data and changes thereto, etc. Computing device(s) 160 may include one or more mobile and/or non-mobile devices such as smartphones, tablet computing devices, wearable computing devices (e.g., a smartwatch, smart optical wear, etc.), personal computing devices such as laptops, voice-activated digital assistance devices (e.g., smart speakers having chat bot capabilities), portable media devices, vehicle systems, etc., that may access one or more software applications running locally or remotely. In some examples, one or more user computing devices 160 may access the central computing system 110, the target computing system 150, and/or one or more sensors 155 at the same time or at different times. For example, a user may access the central computing system 110 via a digital assistance device 160 while also accessing the central computing system 110 using a wearable computing device 160 (e.g., a smart watch). In other examples, the user may access the central computing system 110 via a digital assistance device 160 and later access the central computing system 110 via a vehicle system 160. Each computing device 160 may include I/O device(s) and sensor(s) to provide suitable interactivity, interfacing, and other functionality. Computing device(s) 160 may include, for example, a keyboard, a keypad, a mouse, joystick, a touch screen, a microphone, a biometric device (e.g., a fingerprint sensor), a virtual reality headset, smart glasses, a camera, a global positioning system (GPS) device, etc.

In some embodiments, the central computing system 110 can communicate directly with sensor(s) 155 to obtain reading(s) (e.g., request additional reading(s) to confirm a prior reading). The central computing system 110 can also interface with a set of one or more non-federated computing systems 170. The non-federated computing system(s) 170 may obtain sensor data from separate sensor(s) 175 that are not directly accessible to the central computing system 110 or the target computing system 150. As used herein, non-federated computing system(s) 170 are generally associated with other entities that do not operate under a common management authority for security protocols and communication standards. The non-federated system(s) 170 are non-federated with respect to each other, with respect to target computing system 150, and with respect to central computing system 110. Access may be obtained, for example, via one or more application programming interface (API) that allow for API "calls" (e.g., API requests) for data exchange.

Central computing system 110 (as well as the other computing systems and devices in FIGS. 1 and 2) can include one or more controllers 105, which may be, or may comprise, one or more processing units. A processing unit can include a single processor, which can have one or more cores, or multiple processors. In some embodiments, processing units can include a general-purpose primary processor as well as one or more special-purpose co-processors such as graphics processors (e.g., graphics processing units (GPUs)), digital signal processors (DSPs), or the like. The processing units can include one or more devices (e.g., random access memory (RAM), read-only memory (ROM), flash memory, hard disk storage, etc.) for storing data and/or computer code for completing and/or facilitating the various processes described herein. The memory may include non-transient volatile memory, non-volatile memory, and non-transitory computer storage media. The memory may include database components, object code components, script components, or any other type of information structure for supporting the various activities and information structures described herein. The memory may be communicatively coupled to one or more processors and may include computer code or instructions for executing one or more processes described herein. In some embodiments, some or all processing units can be implemented using customized circuits, such as application specific integrated circuits (ASICs) or field programmable gate arrays (FPGAs). In some embodiments, such integrated circuits execute instructions that are stored on the circuit itself.

In other embodiments, processing units can execute instructions stored in local storage. Any type of processors in any combination can be included in controllers 105.

Central computing system 110 (as well as the other computing systems and devices in FIGS. 1 and 2) can include one or more network interfaces 112, which can provide connections to various networks or to any other systems or devices via any number of wired or wireless communication protocols. In various embodiments, network interfaces 112 can include a wired interface and/or a wireless interface implementing various data communication standards such as Wi-Fi, Bluetooth, cellular data network standards, and/or near-field communication (NFC). The devices and systems in FIGS. 1 and 2 may interface via a network that may be composed of multiple connected sub-networks or autonomous system (AS) networks, which may meet at one or more of: an intervening network (a transit network), a dual-homed gateway node, a point of presence (POP), an Internet exchange Point (IXP), and/or additional other network boundaries. The network can be a local-area network (LAN) such as a company intranet, a metropolitan area network (MAN), a wide area network (WAN), an inter network such as the Internet, or a peer-to-peer network (e.g., an ad hoc Wi-Fi peer-to-peer network). The data links between nodes in the network may be any combination of physical links (e.g., fiber optic, mesh, coaxial, twisted-pair such as Cat-5 or Cat-6, etc.) and/or wireless links (e.g., radio, satellite, microwave, etc.). The network can include carrier networks for mobile communication devices, e.g., networks implementing wireless communication protocols such as the Global System for Mobile Communications (GSM), Code Division Multiple Access (CDMA), Time Division Synchronous Code Division Multiple Access (TD-SCDMA), Long-Term Evolution (LTE), or any other such protocol including so-called generation 3G, 4G, 5G, and 6G protocols. The network can include short-range wireless links, e.g., via Wi-Fi, BLUETOOTH, BLE, or ZIGBEE, sometimes referred to as a personal area network (PAN) or mesh network. In various arrangements, the network interface controller implements one or more network protocols such as Ethernet. The network may be public, private, or a combination of public and private networks. The network interfaces may include, or may be, one or more network interface controllers that can manage data exchanges with devices in the network (sometimes referred to as a network interface port). The network interface controller can handle the physical and data link layers of the Open Systems Interconnection (OSI) model for network communication. In some arrangements, some of the network interface controller's tasks may be handled by one or more processing circuits. In various arrangements, the network interface controller is incorporated into the one or more processing circuits (e.g., as circuitry on the same chip).

Central computing system 110 (as well as the other computing systems and devices in FIGS. 1 and 2) can include one or more input and output (I/O) devices 115 for interacting or interfacing with users. I/O devices 115 can be, or can include, one or more user input devices and/or one or more user output devices. User input devices can include any device (or devices) via which a user can provide signals to computing system or device that can interpret the signals as indicative of particular user interactions. In various embodiments, user input devices can include any or all of a keyboard, touch pad, touch screen, mouse or other pointing device, scroll wheel, click wheel, dial, button, switch, keypad, microphone, and so on. User output device(s) can include any device via which a computing device or system can provide information to a user. For example, user output devices can include a display to display text and images via various text and/or image generation technologies (e.g., a liquid crystal display (LCD), light-emitting diode (LED) including organic light-emitting diodes (OLED), projection system, cathode ray tube (CRT), or the like), together with supporting electronics (e.g., digital-to-analog or analog-to-digital converters, signal processors, or the like). Some embodiments can include a device such as a touchscreen that function as both input and output device. In some embodiments, other user output devices can be provided in addition to or instead of a display. Examples include indicator lights, speakers, tactile devices, printers, and so on. The I/O devices 115 can include I/O circuitry with suitable input/output ports and/or one or more interconnect buses serving as a local user interface for programming and/or data entry, retrieval, or other user interaction purposes. The I/O circuitry may provide an interface for the user to interact with various applications. For example, the I/O circuit may provide for interactivity via a keyboard, a keypad, a mouse, joystick, a touch screen, a microphone, a biometric device (e.g., a fingerprint sensor), a virtual reality headset, smart glasses, a camera suitable for taking photographic images and/or scanning QR codes, etc.

Central computing system 110 (as well as the other computing systems and devices in FIGS. 1 and 2) can include one or more databases for storing data, such as a sensor database 120, rules database 125, and a rule recommendation database 126. In various embodiments, sensor database 120 rules database 125 and rule recommendation database 126 can be a single integrated database, or either (or both) can comprise one or multiple databases. Sensor database 120 can include raw sensor data as well as processed sensor data, as well as auxiliary data such as metadata and/or other auxiliary data related to sensor data and/or annotations and/or labels applied to sensor data. Sensor database 120 can include raw/original or modified sequence of data points for example a time series. Rule recommendation database 126 can include detection rules generated for or with respect to sensor data, as well as data (e.g., metadata) about the detection rules and their application or applicability to various other data, such as history of use of the detection rules and modifications to the detection rules, along with annotations and labels applied to detection rules. Rules database 125 can include an ordered sequence of detection rules configured to optimally detect data errors and anomalies for a specific, unique sensor data set.

Central computing system 110 (as well as the other computing systems and devices in FIGS. 1 and 2) can include a rule and feature generator 130, which can identify sensor data features and/or detection rules based on sensor data and/or auxiliary data and how sensor data and/or auxiliary data was previously processed (e.g., modified, annotated, and/or labeled), as will be further discussed below. Analyzer 135 can analyze and transform sensor data and/or auxiliary data, as will be further discussed below. Rule recommender 140 can generate new or updated detection rules and machine learning models that can be used to initiate an action including but not limited to "cleaning" past or future sensor data and/or auxiliary data as will be discussed below.

Referring to FIG. 2, the central computing system 110 is replaced by the computing system 210 to indicate that elements and functionality of the central computing system 110 can be incorporated into the target computing system 150, or vice versa, (e.g., central computing system 110 and target computing system 150 can be wholly or partially merged into one system). In FIG. 2, controllers 205 corresponds to controllers 105, network interfaces 212 corresponds to network interfaces 112, I/O devices 215 corresponds to I/O devices 115, sensor database 220 corresponds to sensor database 120, rules database 225 corresponds to rules database 125, rule recommendation database 226 corresponds to rule recommendation database 126, rule and feature generator 230 corresponds to rule and feature generator 130, analyzer 235 corresponds to analyzer 135, rule recommender 240 corresponds to the rule recommender 140, sensors 255 corresponds to sensors 155, computing devices 260 corresponds to computing devices 160, non-federated systems 270 corresponds to non-federated systems 170, and sensors 275 corresponds to sensors 175.

Figure 3:
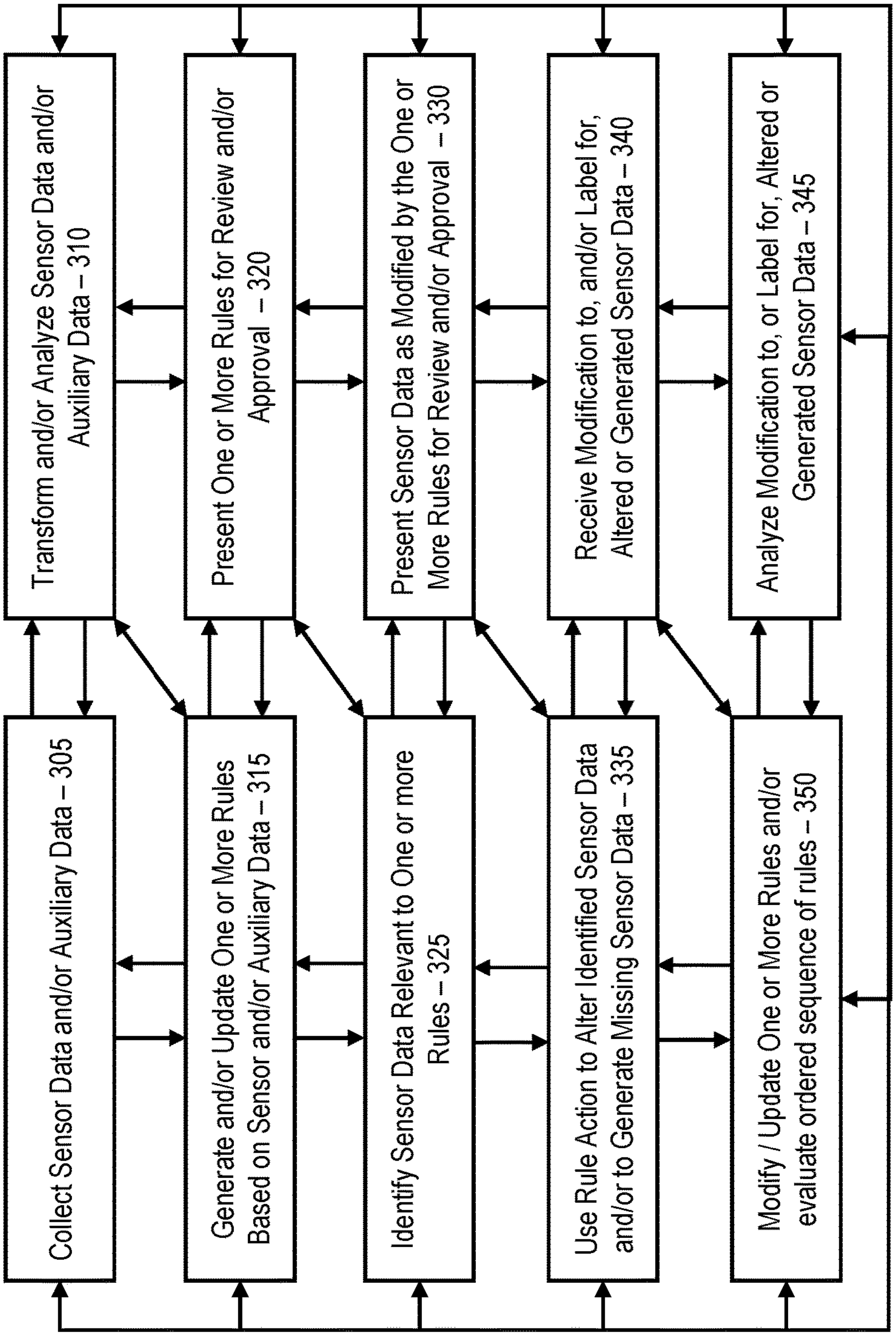
FIG. 3 is a flowchart for potential implementations of the disclosed approach, according to some arrangements.

Referring to FIG. 3, disclosed is an example process 300 according to various potential embodiments. As indicated by the arrows in FIG. 3, process 300 is a flexible process that may proceed through many different paths, examples of which will now be discussed. The various steps of process 300 may be performed by central computing system 110 or computing system 210 (via components thereof), target computing system 150, sensors 155/255, and computing devices 160/260. Process 300 may begin at step 305, which includes collecting, retrieving, or receiving sensor data. The sensor data may be obtained by or via, for example, the central computing system 110/computing system 210 (e.g., by analyzer 135/235), which may obtain the data from target computing system 150, from one or more computing devices 160, or directly from one or more sensors 155. In various embodiments, sensor data may be obtained from one or more non-federated computing systems 170/270. The sensor data and auxiliary data may be stored in sensor database 120/220.

A set of sensor data may be a time series of sensor data, such as readings taken over a time period (e.g., first quarter of 2024 or January 2025), a span of time (e.g., six weeks of readings), or a number of sequential sensor readings irrespective of time period (e.g., 50, 100, or 500 readings). Sensor data can be raw sensor readings from sensors 175/275. Alternatively or additionally, sensor data can be readings that have been processed, such as by the sensor itself or by an intermediary recipient of the raw sensor data (e.g., by a computing device 160/260). Processing of raw sensor readings may include, for example, normalizing readings, transforming readings from one domain into another domain, converting units, or modifying data using one or more detection rule action including but not limited to one or more machine learning models.

Step 305 may also, or alternatively, include receiving auxiliary data corresponding to the sensor data. The auxiliary data may be, or may include, for example among other things, a definition of how the sensor data was modified by one or more users. For example, such modifications may have been made by one or more users because of prior experience with the sensor, and/or based on the conditions faced by the sensor (e.g., if a reading is known to have been taken by a sensor when the ambient temperature fell outside of nominal operating parameters of the sensor). The definition may, for example, indicate how certain sensor data was modified in a certain way, without necessarily providing the modified version of the sensor data. For example, such definition may indicate that all, or a subset of, readings (e.g., readings on a certain day, during certain conditions, or from certain sensors) were modified by applying a specified formula (e.g., by applying a multiplier such as 1.1x).

The auxiliary data may be, or may include, for example, the sensor data as modified by the one or more users. The sensor data may, for example, be a first set of sensor data, and the auxiliary data may, for example, be a first set of modified sensor data. The first set of modified sensor data may include the same number of readings (with at least one reading modified from its original value), may include fewer readings (e.g., if one or more readings were marked for deletion for low reliability or for another reason), or a greater number of readings (e.g., if one or more predicted readings were added to a time series).

The auxiliary data may be, or may include, for example, metadata about the sensor readings, such as location of sensor when reading was taken, time of sensor reading, length of time during which a certain sensor component was active for obtaining the sensor reading (e.g., for how long was a parameter being detected before settling on a sensor reading value). The metadata may indicate, for example, nominal operating conditions for a sensor or a component thereof. The auxiliary data may be, or may comprise, for example, one or more labels applied to the sensor data automatically or by a user, with the labels for example characterizing or otherwise providing information about the readings from the sensor.

The auxiliary data may include, for example, data from at least one or more other sensors (which may be referred to as "secondary" sensors) not included in the set of one or more sensors (which may be referred to as "primary" sensors) used to obtain a reading. For example, for one or more sensor readings by a primary sensor in a time series, one or more corresponding readings from one or more secondary sensors may be provided. For example, the one or more secondary sensor readings may be provided due at least in part to the one or more secondary sensors being in a relevant geographic vicinity with respect to the primary sensor(s) (e.g., within a predetermined distance, such as within one meter, 100 meters, one kilometer of a primary sensor or other sensor characteristic relevant to the primary sensor, etc.), at the same or similar or otherwise relevant natural body (e.g., same or similar lake), at the same or similar or otherwise relevant altitude (e.g., sea level or within 100 meters of sea level), and/or otherwise due at least in part to its being deemed to provide potentially relevant information (e.g., experiencing the same cold front or other weather system) regarding the primary sensor or primary sensor reading(s). One or more of the secondary sensors may be sensors of the same type as one or more of the primary sensors, or of a different type. Secondary sensors may be used to measure a same parameter (e.g., both primary and secondary sensors measure temperature or salinity) or a different parameter (e.g., primary sensors measure temperature whereas secondary sensors measure salinity). The one or more secondary sensors may measure the same parameter using a different mechanism (e.g., a primary sensor may use an electrical signal obtained using a capacitative element to obtain a reading, whereas a secondary sensor may use an electrical signal obtained using a piezoelectric component or an inductive element). The one or more secondary sensors may measure the same parameter, or a different parameter deemed to correlate with a first parameter (e.g., a primary sensor may detect temperature levels whereas a secondary sensor may detect pressure levels). The readings from the one or more secondary sensors may have been taken at the same time, or within a window of time deemed relevant (e.g., a reading taken by a secondary sensor not more than a predetermined time before or after a corresponding reading from a primary sensor).

In various embodiments, process 300 may proceed to step 315 directly, or via step 310. At step 310, the sensor data and/or the auxiliary data may be transformed if needed (e.g., by being normalized, standardized, etc.). Such transformation may be performed by or via, for example, central computing system 110 (e.g., rule and feature generator 130 and/or analyzer 135), target computing system 150, and/or one or more computing devices 160. The time series of sensor data may be analyzed, for example, to determine patterns in the data, to determine how that data was previously deemed trustworthy or not trustworthy by a detection rule, by one or more machine learning models, and/or by one or more users, and/or to determine conditions experienced by the sensor that may suggest the data is trustworthy or not trustworthy. For example, if data from a secondary sensor indicates that a primary sensor was operating in conditions outside of nominal working parameters of the primary sensor (which may be part of metadata included in auxiliary data), the sensor data may be assigned a lower confidence score than if the secondary sensor indicates that the primary sensor was operating in conditions within nominal working parameters of the primary sensor. In various embodiments, the analysis at step 310 may indicate that no value above or below a certain threshold (e.g., a cutoff value) or outside of a range has been accepted.

In various embodiments, analyzing the sensor data and/or auxiliary data may comprise selecting a subset of such data and determining one or more modifications or classes of modifications made to the subset of such data. For example, a subset of sensor data and/or auxiliary data may be selected for falling within a time period (e.g., between midnight and 6:00 am), and/or for occurring under certain conditions (e.g., when temperatures fall within a range).

It may then be determined what proportion of the data were modified (e.g., 50%, 70%, or 90%). If a certain proportion of the subset of data (e.g., a proportion exceeding a threshold such as 85%, 95%, or 99%) were modified, a class of modifications or a formulaic expression of the modifications may be determined. An expression may be determined, for example, by running a regression analysis (e.g., to determine best fit) and/or by employing any other suitable machine learning techniques. Additionally or alternatively, it may be determined what modifications (or classes of modifications) were made to the data. The sensor data and/or auxiliary data may be clustered by modification (or type of modification), and the data falling in each cluster may be characterized to identify which data should be modified according to the modification or type of modification. Identifying one or more characteristics of the sensor and/or auxiliary data to which particular modifications were made can be used in determining which subsequent data a detection rule is applicable to.

At step 315, one or more detection rules may be generated (or updated) based on the sensor data and/or auxiliary data (if, e.g., process 300 proceeded from step 305 to step 315), or based on analysis of the sensor data and/or auxiliary data from step 310 (if, e.g., process 300 proceeded from step 305 to step 310 before proceeding to step 315). Generating a detection rule may comprise generating a formulaic expression, training or updating a machine learning model, etc. The one or more detection rules may be heuristic rules or detection rules that are less complex. A detection rule may include one or more conditions for triggering the detection rule (e.g., when certain auxiliary data is available, when certain auxiliary data indicates a condition, etc.), along with one or more actions or operations to be performed if the one or more conditions are satisfied (e.g., an expression to be applied to sensor data or application of a machine learning model to the sensor data). The detection rule may be added to rule recommendation database 126.

Detection Rule Example Code

Example implementations may employ processes in accordance with this example pseudo code for applying level threshold detection rules to an input time series from a database and return the indices of the detected outliers captured by the detection rules. This example pseudo code may employ:

Input: input_time_series;

Input: level_threshold_rules includes level threshold maximum and minimum detection rules to be applied;

Output: out_of_range_indices is the array of indices in the time series detected by the rules.'

```
function level_threshold_rules(input_time_series, level_threshold_rules)
out_of_range_indices=find_time_series_indices_where
  (input_time_series>level_threshold_rules.settings.maximum OR
  input_time_series<level_threshold_rules.settings.minumum)
return out_of_range_indices
```

Example implementations may employ processes in accordance with this example pseudo code for applying rate-of-change detection rules to an input time series from database and return the indices of the detected outliers captured by the detection rules. This example pseudo code may employ:

Input: input_time_series;

Input: rate_of_change_rules includes rate-of-change maximum and minimum detection rules to be applied;

Output: out_of_range_indices is the array of indices in the time series detected by the rules.'

```
function rate_of_change_rules(input_time_series, rate_of_change_rules)
rate_of_change_time_series=calculate_rate_of_change_series (input_time_series)
out_of_range_indices=find_time_series_indices_where
  (rate_of_change_time_series>rate_of_change_rules.settings.maximum OR
  rate_of_change_time_series<rate_of_change_rules.settings.minumum)
return out_of_range_indices
```

Example implementations may employ processes in accordance with this pseudo code for applying flatline detection rules to an input time series from database and return the indices of the detected outliers captured by the detection rules. This example pseudo code may employ:

Input: input_time_series;

Input: flatline_rules includes flatline block window and tolerance detection rules to be applied;

Output: flatline_indices is the array of indices for the flatline blocks in the time series detected by the rules.

```
function flatline_rules(input_time_series, flatline_rules)
value_difference_series=calculate_value_difference_of_time_series(input_time_series)
flatline_block_series=find_flatline_blocks (value_difference_series, flatline_rules.settings.tolerance)
flatline_indices=find_indices_of_block_windows_where (flatline_block_series.window>flatline_rules.settings.window)
return flatline_indices
```

Example implementations may employ processes in accordance with this example pseudo code for applying all three detection rules to an input time series from database and return the indices of the detected outliers captured by all the detection rules. This example pseudo code may employ:

Input: input_time_series_id which is the identifier of the time series in the database;

Output: final_anomaly_indices is the array of indices in the time series detected by all detection rules applied.

```
'''read time series from time series database'''
function combined_rules(input_time_series_id)
input_time_series=get_time_series_from_database(input_time_series_id)
'''read rules from rule database'''
level_threshold_rules=
get_level_threshold_rules_from_rule_database
(input_time_series_id)
rate_of_change_rules=get_rate_of_change_rules_from_rule_database(input_time_series_id)
  flatline_rules=get_flatline_rules_from_rule_database
  (input_time_series_id)
'''apply rules in sequential order'''
out_of_range_level_threshold_indices=level_threshold_rules(input_time_series, level_threshold_rules)
intermediate_time_series=input_time_series.delete
  (out_of_range_level_threshold_indices)
out_of_range_rate_of_change_indices=rate_of_change_rules(intermediate_time_series,
  rate_of_change_rules)
intermediate_time_series=intermediate_time_series.delete (out_of_range_rate_of_change_indices)
fianl_anomaly_indices=flatline_rules(intermediate_time_series, flatline_rules) return final_anomaly_indices
```

Detection Rule Generation Example Code

Example implementations may employ processes in accordance with the following example pseudo code that uses historical time series data (corrected, quality controlled or raw, uncorrected) to generate level threshold detection rule. This example pseudo code may employ:

Input: time_series which is the historical time series read from time series database;

Output: level_threshold_rule object which is maximum and minimum recommended level thresholds rules.

```
function generate_level_threshold_rule(time_series)
  min_value=get_minimum_time_series_value(time_series)
  max_value=get_maximum_time_series_vaule(time_series)
  '''Calculate minimum and maximum thresholds with 10% margin'''
level_threshold_rule.settings.minimum=min_value−(get_absolute_value(min_value)*0.1)
level_threshold_rule.settings.maximum=max_value+(get_absolute_value(max_value)*0.1)
return level_threshold_rule
```

Example implementations may employ processes in accordance with the following example pseudo code that uses historical time series data to generate rate-of-change maximum and minimum detection rule. This example pseudo code may employ:

Input: time_series which is the historical time series read from time series database;

Output: rate_of_change_rule object which is maximum and minimum recommended rate-of-change thresholds rule.

```
function generate_rate_of_change_rule(time_series)
rate_of_change_time_series=calculate_rate_of_change_series (time_series)
min_value=get_minimum_time_series_value(rate_of_change_time_series)
max_value=get_maximun_time_series_value(rate_of_change_time_series)
"'Calculate minimum and maximum rate-of-change thresholds with 10% extra margin"'
rate_of_change_rule.settings.minimum=min_value-(get_absolute_value(min_value)*0.1)
rate_of_change_rule.settings.maximum=max_value+(get_absolute_value(max_value)*0.1)
return rate_of_change_rule
```

Example implementations may employ processes in accordance with the following example pseudo code that generates a time series of rate-of-change in value unit per seconds (e.g., C/s for water temperature). This example pseudo code may employ:

Input: time_series-series of time-value pairs;

Output: time series of rate-of-change in value unit per seconds (e.g. C/s for water temperature).

```
function calculate_rate_of_change_series (time_series)
value_difference_series=calculate_value_difference_of_time_series (time_series)
time_difference_series_in_seconds=calculate_time_difference_of_time_series_in_seconds (time_series)
rate_of_change_time_series=value_difference_series/time_difference_series_in_seconds
return rate_of_change_time_series
```

Example implementations may employ processes in accordance with the following example pseudo code that uses historical time series data to generate maximum window (time series block) size detection rule calculated from the input tolerance. This example pseudo code may employ:

Input: time_series which is the historical time series read from time series database;

Input: flatline_tolerance is the tolerance for calculating flatlines. A flatline is a block or window in a time series where the change in consecutive values in the block are smaller than a given tolerance;

Output: flatline_rule object which is the maximum window (time series block) size calculated from the input tolerance.

```
function generate_flatline_rule(time_series, flatline_tolerance)
value_difference_series=calculate_value_difference_of_time_series(time_series)
flatline_block_series=find_flatline_blocks (value_difference_series, flatline_tolerance)
sorted_flatline_block_series=sort_flatline_blocks_window_size_in_ascending_order (flatline_block_series)
flatline_rule.settings.window=get_last_element_of_block_series (sorted_flatline_block_series)
flatline_rule.settings.tolerance=flatline_tolerance
return flatline_rule
```

Example implementations may employ processes in accordance with the following example extreme outlier removal pseudo code. The following example pseudo code calculates reversed empirical cumulative distribution function from the input time series values, and then finds and removes values outside (1-outlier_cutoff_probability) confidence bound. This example pseudo code may employ:

Input: input_time_series. It can be raw (unmodified sensor data) or corrected (quality controlled sensor data). historical time series read from time series database;

Input: outlier_cutoff_probability which is the cutoff probability threshold used to remov extreme outliers on both tails of the cumulative distribution function;

Output: output_time_series is a version of input_time_series where detected extreme outliers are removed and replaced with NaN (not a number).

```
function apply_extreme_outlier_removal (input_time_series, outlier_cutoff_probability) ecdf_lookup_table=
calculate_empirical_cumulative_distribution_function (input_time_series.values)
max_threshold=calculate_inverse_ecdf (ecdf_lookup_table, 1-outlier_cutoff_probability)
min_threshold=calculate_inverse_ecdf (ecdf_lookup_table, outlier_cutoff_probability)
extreme_outlier_indices=find_time_series_indices_where (input_time_series<min_thresholdOR input_time_series>max_threshold)
output_time_series=fill_extreme_outlier_indices_with_nan (input_time_series, extreme_outlier_indices)
return output_time_series
```

Example implementations may employ processes in accordance with the following example of applying an Extreme Outlier Removal process before generating rate-of-change detection rule. This example pseudo code may employ:

Input: time_series which is the historical time series data read from time series database;

Input: outlier_cutoff_probability which is the cutoff probability threshold used in Extreme Outlier Removal;

Output: rate_of_change_rule object which are the maximum and minimum recommended rate-of-change thresholds.

```
function
calculate_rate_of_change_rules_with_extreme_outlier_removal (input_time_series, outlier_cutoff_probability)
outlier_removed_time_series=apply_extreme_outlier_removal (input_time_series, outlier_cutoff_probability)
rate_of_change_time_series=calculate_rate_of_change_series (outlier_removed_time_series)
min_value=get_minimum_time_series_vaule (rate_of_change_time_series)
max_value=get_minimum_time_series_vaule (rate_of_change_time_series)
rate_of_change_rule.settings.minimum=min_value-(get_absolute_value(min_value)*0.1)
rate_of_change_rule.settings.maximum+ (get_absolute_value(max_value)*0.1)
return rate_of_change_rule
```

Process 300 may proceed to step 325 directly from step 315, or may proceed to step 320 before proceeding to step 325. At step 320, one or more detection rules may be presented (e.g., by or via central computing system 110, target computing system 150, and/or computing devices 160) to one or more users. The detection rules may be presented by or via I/O devices 115. Presenting a detection rule may comprise presenting a definition of the detection rule (e.g., on a display screen), such as a condition for triggering the detection rule and an operation (e.g., application of a model or expression) performed by the detection rule when triggered. Additionally or alternatively, a detection rule may be presented by displaying hypothetical or actual data and how the data would be modified by the detection rule. A user may then approve or otherwise accept (e.g., via I/O devices 115) application of a new or updated detection rule when the new or updated detection rule is triggered. The indication of approval may also be saved.

At step 325 (which may be performed, e.g., by or via central computing system 110, target computing system 150, and/or computing devices 160), sensor data that triggers one or more active detection rules may be identified. In various embodiments, the sensor data may be collected from sensor database 120, from target computing system 150, from one or more computing devices 160, and/or directly from one or more sensors 155. In various embodiments, at step 330, the sensor data and/or the modified sensor data (as modified upon application of one or more detection rules) can be presented (e.g., by or via central computing system 110, target computing system 150, and/or computing devices 160 via I/O devices 115) for review and/or approval. Data may be modified by, for example, applying an expression or machine learning model to sensor readings. In some embodiments, certain missing data may be generated (e.g., using a machine learning model of the detection rule). In some embodiments, certain data may be deleted if confidence in that data is sufficiently low, such as when the confidence is below a first percentage that the true value is within a second percentage of the reading, such as below 90% confidence that the true value is within 5% of the reading. Similarly, deletion of data may be based on a confidence score being below a certain threshold. Confidence may be based on such factors as the age of a sensor, the conditions when a reading was taken, etc.

Process 300 may proceed to step 335, at which one or more detection rule actions are applied to sensor data. This may comprise, for example, modifying certain sensor data in the sensor database 120, adding certain generated sensor data to the sensor database 120, and/or deleting certain sensor data from the sensor database 120. In various embodiments, process 300 may oscillate between step 325 (identifying sensor data to which one or more detection rules are applicable) and step 335 (applying detection rules to the corresponding sensor data) as more sensor data and/or auxiliary is added or modified. The oscillation may continue until, for example, there is collection of data at 305, there is generation of one or more detection rules at 315, there is rule review at 320, there is a data review at 330, there is a modification or label at 340, and/or there is a rule modification at 350.

As needed, one or more detection rules may be modified or updated at step 350. Detection rules may be updated based on subsequent inputs or data. For example, at step 340, one or more additional changes can be made to already-modified sensor data (e.g., already modified via application of a detection rule) by a user. For example, a modification by a detection rule action might not have been adequate, or may have been based on incomplete information. A user might undo a change, add a missing value, delete a value predicted by a detection rule, etc. Additionally or alternatively, at 340 a user may apply a label to data, providing additional information about data that can impact one or more detection rules. A detection rule may be updated based on the additional information provided through labels. In some embodiments, the changes made or labeling applied at step 340 might be automatic via, for example, application of a detection rule or other operations or functionality.

Figure 4:
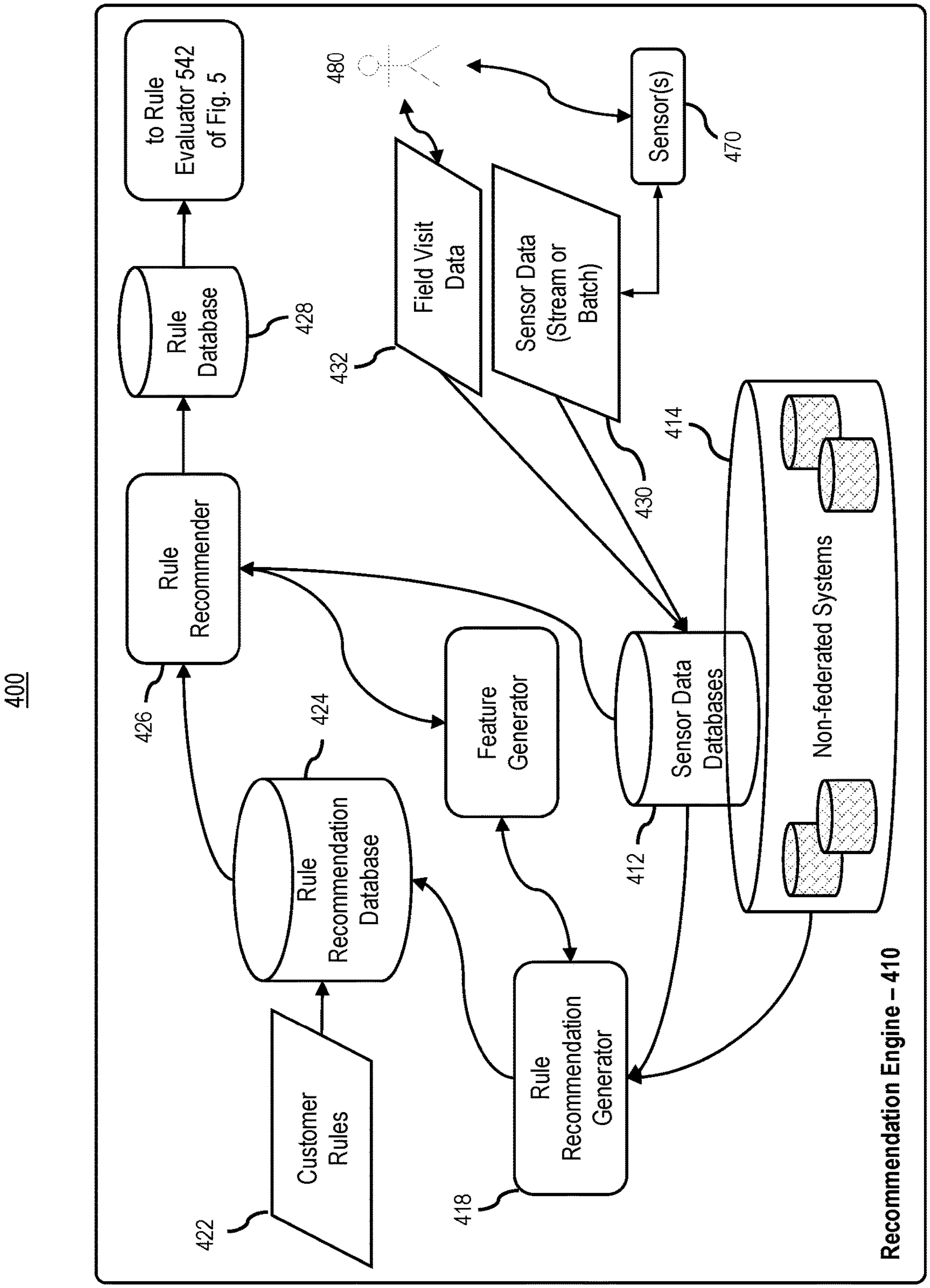
FIG. 4 is a first portion of a flowchart, which connects to a second portion of the flowchart in FIG. 5 as indicated, according to some arrangements.
Figure 5:
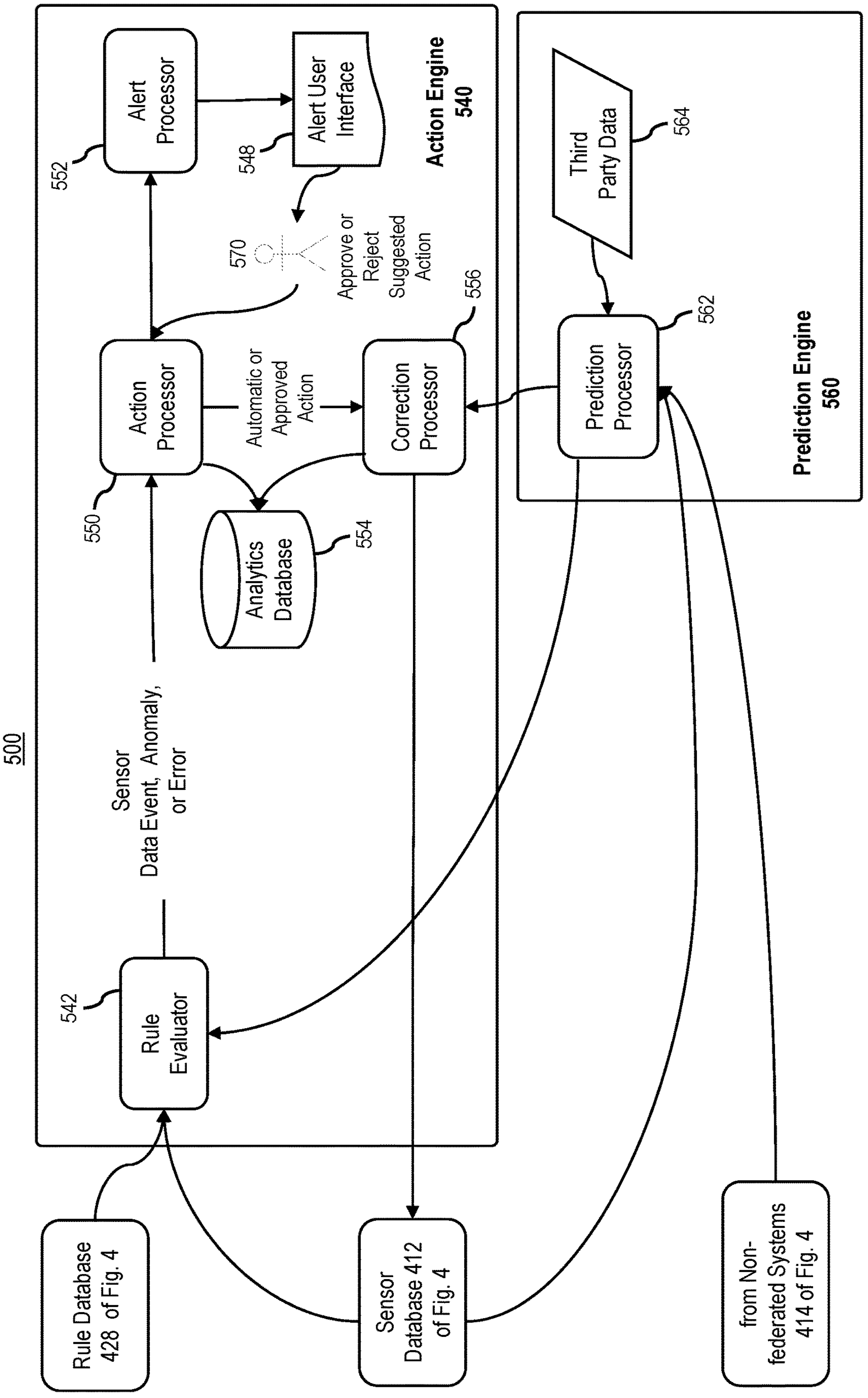

With reference to FIGS. 4 and 5, in various embodiments systems 400 and 500 may include a recommendation engine 410, an action engine 540, and a prediction engine 560. Detection rules can be generated (e.g., by central computing system 110) from the historical data (e.g., stored in sensor databases 412) of multiple customer computing systems or other entity systems such as non-federated systems 414. The historical data may have been previously corrected and labeled by one or more human users (e.g., via target computing system 150 and/or computing devices 160). For each historical time series, detection rules and an associated set of features can be generated and/or extracted and stored in a rule recommendation database 424. Known detection rules may also be manually input and directly stored in the rule recommendation database 424. When commissioning a new system (e.g., on-boarding a customer) or when specifically requested by a customer, the rule recommendation database 424 can be queried and, for each time series for which a recommendation is requested, the optimal sequence or order of detection rules in the rule recommendation database 424 may be returned and stored in the customer specific rule database 428. As sensor data flows into the system (e.g., into target computing system 150), the system can apply the previously-configured detection rules from the rule database 428 to the data in the time series databases to identify data errors or anomalies. If data errors are found, an alert (e.g., alert user interface (UI) 552) may be generated (e.g., via alert manager 548), and the action engine 540 may suggest or automatically apply corrective actions (e.g., via action manager 550) according to system configuration.

In various embodiments, the rule recommendation database 424 may be a database of possible detection rules extracted and collected over time. The rule recommendation database 424 can have a schema that includes a record creation date (e.g., date and time when a recommendation was added to the rule recommendation database 424), as well as a date range for the data used to generate a recommendation. The rule recommendation database 424 can also include various features. Example features can include, but are not limited to, features describing the time series that have been extracted from either metadata (e.g., parameter such as water temperature) or from the time series data itself. These can include, for example: source (e.g., the data from which the detection rule was extracted including a specific time series or time series, or a customer's standard data processing procedure such as the data processing and collection standards develop by the US Geological Surveys); customer ID (e.g., customer identifier if time series was extracted from a specific customer); parameter (e.g., an identification of what phenomenon or phenomena are being measured, such as pH, flow rate, etc.); unit (e.g., the unit of measurement for the phenomenon, such as feet or meter); and/or location or region (e.g., a description or identification of location, such as latitude, longitude, altitude, or geographic area such as Pacific Northwest). Additional example features can include, but are not limited to, time series features that are descriptive of the time series data. These can include, for example: minimum ("min"); maximum ("max"); standard deviation ("std"); and/or transforms such as continuous wavelet transform (CWT) or Fourier transform. Yet other example features can include, but are not limited to, features related to environmental context, such as features about the environment or the context in which the data was collected. These can include, for example average/min/max air temperature and/or average min/max precipitation. The rule recommendation database 424 can include, for example, a level threshold detection rule, and settings corresponding to, for example, min/max values. Table 1 provides an example schema for the rule recommendation database. The rule recommendation database 424 can also include details of the detection rules associated with the features—for example, the rule type (e.g., level threshold or rate of change threshold) and the associated settings or parameters that describe how the detection rule is applied. A level threshold detection rule, for example, may have settings that define the upper and lower bounds of values that are deemed to be correct.

TABLE 1

Example Rule Recommendation Database Schema

| Creation Date | Features Source | Customer Id | Parameter | Units | Location | Time Series min | Time Series max | Rule Rule Type | Settings 1 | Settings 2 |
|---|---|---|---|---|---|---|---|---|---|---|
| Nov. 1, 2022 | Extracted | 00001 | Stage | M | 94, 94 | 3 | 450 | Level Threshold | Min = 6 | Max = 440 |

The rule recommendation generator 418 may employ a process that extracts feasible detection rules from time series data and the associated features from time series data, metadata and other external data sources. For example, this process may involve a computational process in which, for each time series in any/all available time series databases: (i) extract the features $f_{i=1 \ldots k}$ (further discussed below); (ii) for each rule type, extract the settings $rs_{i=1 \ldots j}$ (further discussed below); and (iii) create a record in the rule recommendation database 424. This process may be executed on a periodic basis to generate and/or update based on new data being added to the system. An example record generated by the rule recommendation generate 418 and stored in the rule recommendation database 424 is provided in Table 2.

TABLE 2

Example Rule Recommendation Generator Record

| Creation Date | Features Source | Customer Id | Parameter | Units | Location | Time series min | Time Series max | Rule Rule Type | Setting 1 | Setting 2 |
|---|---|---|---|---|---|---|---|---|---|---|
| Nov. 1, 2022 | Rule Generator | 00001 | Stage | M | North America | 3 | 3000 | Level Threshold | Min = 6 | Max = 440 |

The rule recommendation generator 418 may employ feature extraction and detection rule extraction. With respect to feature extraction, features may include: metadata such as (but not limited to) parameter, unit, and/or location; time series features such as (but not limited to) min, max, std, percentiles, and/or CWT; environmental/context data from external data sources such as (but not limited to) summary weather/climate data. With respect to detection rule extraction: a level threshold minimum may be min time series value−10%, and a maximum level threshold may be max time series value+10%; minimum rate of change might be min derivative (time series value)−10%, and max rate of change might be max derivative (time series value)+10%.

Rule recommender 426 may employ a process of recommending the ordered sequence of detection rules deemed to be the best from among the set of detection rules contained in the rule recommendation database 424 based on the features. This may be run on a batch of time series (e.g., at the time of commissioning a new system), or on individual time series (e.g., when a time series is added to the system or when a user requests a recommendation). This may also be run periodically to determine if there is a better detection rule or a better order of detection rules (e.g., a change in detection rule order in which detection rules are executed may change based on rule evaluation and/or on new data, and could, in potential embodiments, be implemented through empirical analysis in which the system may determine whether a different order leads to better results) than is currently configured for a specific time series.

If no detection rules exist in the rule database 428 for a time series, the rule recommender 426 may: for each time series, extract time series features (discussed above); for each detection rule type, find the best matching order sequence of detection rules based on features in the rule recommendation database; and create a record in the rule database 428.

If detection rules exist in the rule database 428 for the time series, the rule recommender 426 may: for each time series, extract time series features (discussed above with respect to feature extraction); for each detection rule type, find best matching order sequence of detection rules (discussed below with respect to feature matcher) based on features in the rule recommendation database 424. The rule recommender 426 may then determine if the extracted order sequence of detection rules is better than the existing order sequence of detection rules. If the extracted detection rule is better than the existing detection rule, the user may be notified, or the record in the rule database 428 may be automatically updated. If the extracted detection rule is not better than the existing detection rule, no action is taken.

Detection rules in the rule database 428 may have Settings and Attributes and may be associated with Actions. Settings define the specific behavior of a detection rule, for example in the detection rule “sensor data values are less than 5 m”, 5 m is the setting. Settings may also include the specific time period or season (e.g., time of year or time of day) the detection rule is to apply to. Attributes may provide context and metadata to help users process and interpret the results of executing a detection rule, for example the operational severity of the error or anomaly. Detection rule actions (or simply actions) define how the detected data error or anomaly should be processed, for example deleting the identified data, setting metadata (e.g., grade or qualifier) for the identified data, and/or generating notifications. As will be explained below these actions may then generate alerts.

TABLE 3

Example Detection Rule Database Scheme and Example Detection Rule Record

| Creation Date | Time Series Id | Order | Detection rule: Rule Type | Setting 1 | Setting 2 | Attributes: Applicable Season | Severity | Impacts Operations | Actions |
|---|---|---|---|---|---|---|---|---|---|
| Nov. 1, 2022 | A1002 | 1 | Level Threshold | Min = 6 m | Max = 440 m | Jan-Dec | High | Yes | Automatically Delete Data |
| Nov. 1, 2022 | A1002 | 2 | Rate of Change | Max = 3 m/s | Min = −3 m/s | Mar-Aug | Medium | No | Suggest to user to Delete Data |

The rule recommender 426 may employ a feature matcher sub-process that finds the best detection rules based on the features. For example, for organization A and a target time series where the parameter feature is pH, the rule recommender 426 may find the matching organization standards for pH detection rules (e.g., customer_Id=A and source=standard and parameter=pH) in the rule recommendation database which might include first a level threshold detection rule followed by a rate of change detection rule. This might represent the least complex or minimum required detection rule. The rule recommender 426 may also find all other matching detection rules based on the features in the rule recommendation database 424. If any of the found detection rules are better than the standard, that better detection rule is returned.

The rule recommender 426 may use one or more techniques for the feature matcher sub-process. For example, a match may be defined based on the minimum Euclidian distance in the n-dimensional feature space (where n is a number between 1 and the number of features) between the features in the rule recommendation database 424 and those of the target time. Further, encoding, standardization, normalization, and/or weighing transforms may be applied to the features to achieve the best match. For example, consider the case of a single feature, location; the rule recommender 426 may find the closest matching detection rule by finding the detection rule in the rule recommendation database 426 that is geographically closest to the location of the target time series.

The rule recommender 426 may also use a machine learning classifier to match detection rules by defining clusters or groups of similar detection rules based on the features. In various embodiments, the classifier may be trained via supervised learning techniques. For example, the classifier may, using a k-nearest neighbors (k-NN) process along with the features, identify the cluster to which a time series belongs, and use the average, maximum, or minimum detection rule settings from all time series in the cluster.

In various embodiments, the action engine 540 evaluates the detection rules from the recommendation engine 410 against the sensor and field data entering the system and performs corresponding actions. The action engine 540 may leverage a prediction engine 560 to evaluate detection rules and take actions as will be described below.

The rule evaluator 542 may, in parallel, process the streaming or batch sensor data 430 and field visit data 432 from one, multiple, or many physical sensors [e.g., sensors 155, 255, and/or 470). Field visit data may be obtained, for example, by and/or via user 480. The rule evaluator 542 may run in response to an event within the system or external to it. For example, the rule evaluator 542 may run on a schedule in response to an internal timer event that is generated once every hour on the hour, every day at 0600, on the first day of every month at 0600, etc. Other internal events include but are not limited to new data or auxiliary data arriving in the sensor data database 412, modification of the sensor data in the sensor data database 412, a user request to run the rule evaluator 542, completion of data processing in an external system, and/or a physical event such as a flood.

For each sensor the rule evaluator 542 may access the list of previously configured detection rules in the rules database 428 for the sensor. For example, a specific sensor in the sensor data database 412 may be associated with a sensor or time series identifier. The same time series identifier may be used in the rule database 428. The rule evaluator 542 may use time series identifier to find the list of detection rules that are configured to be evaluated for a specific sensor.

The rule evaluator 542 may determine the specific sequence/order in which the configured list of detection rules are to be executed. This determination may be made based on but not limited to the ordered detection rules that are stored in the rule database 428, the detection rule type, the detection rule settings, the type of action associated with the detection rule, the sensor or auxiliary data, the data required to evaluate a detection rule, and/or the type of event that triggered the rule evaluator 542. Determining rule ordering may be complex, as the outcome of executing one detection rule impacts the outcome of executing the next detection rule in the sequence. Even though an individual detection rule may be a less complex logical expression, when these detection rules are executed in an ordered sequence, they can exhibit emergent complexity. Further complexity arises from the intermingling of detection rules executed automatically and detection rules requiring approval of a user before executing due to the delay introduced by a user responding. This complexity is explored in the following examples. It is noted that, in example embodiments, the rule generator and the rule evaluator may employ similar logic, but the rule generator may not be aware of the execution context and user inputs, so an additional round of ordering may be needed as described below.

Four detection rules A, B, C, and D may be stored in order in the rules database 428 for a specific sensor. The rule evaluator 542 may determine this order (ABCD) is the optimal order to execute the detection rules in. Alternatively, detection rules A and D may be associated with automatic actions and detection rules B and C may be associated with suggested actions. In this case the rule evaluator 542 may determine the order of execution to be all detection rules with automatic actions followed by detection rules with suggested actions (e.g., ADBC). Further, detection rules BCD may have a rule setting of high severity and detection rule A as low severity, for example. In this case the rule evaluator 542 may determine the order of execution to be high severity detection rules followed by low severity detection rules (e.g., BCDA).

Detection rule ordering is a complex process that can have significant impact on the results and effectiveness of the system. For example, consider the following scenario, a period of data where the values are all 0 except for a large spike due to electrical noise in the middle of the period where the value jumps to 10 for a single instant in time. If a detection rule to detect a sensor flatline condition (i.e., a sensor producing the same value over an extended period of time) was executed before the spike was removed, the flatline condition would not be detected. This could lead to faulty conclusions as to the quality and accuracy of the data as well as the health of the sensor. As such, optimal detection rule ordering may also be determined by the empirical analysis of large volumes of historical sensor data from the non-federated system 414 and review with large numbers of practitioners and domain subject experts.

The rule evaluator 542 may determine the data required to evaluate the ordered sequence of detection rules (also see, e.g., block 350 in FIG. 3). Detection rules may require 1 or more sensor data points to be executed. For example, a level threshold detection rule that evaluates if a single sensor data point is above or below specific values requires only a single sensor data point. A rate of change threshold that evaluates if the change over a specific period of time in the sensor value between two points is greater than or less than a specific value requires two sensor data points. More complex detection rules such as those based on machine learning (e.g. autoencoder architecture) may need an extended period of historical data from which to derive a model. Further detection rules may require other sensors including but not limited to secondary time series or field visit data. For example, consider a conditional detection rule where if the air temperature is below −30° C. that the flow of a stream cannot be greater than 0° as the stream is deemed to be frozen. In this case the detection rule operating on the primary stream flow time series would also need air temperature data.

The rule evaluator 542 may request a prediction of the target time series over the period of data determined to be required as described above from the prediction processor 562. For example, a detection rule may define data errors or anomalies relative to the predicted value of the time series. More specifically, a data error may be defined as any value that differs from the predicted values by more than 10%. Specific prediction methods and models are described below. After the detection rule order has been determined and the necessary data has been retrieved, the rule evaluator 542 may execute the detection rules and then forward the results to the action processor 550.

The action processor 550 coordinates the correction of time series via the correction processor 556, the generation of alerts via the alert processor 552, and the interaction between users and the system via the alert user interface 548. The activities of the action processor 550 may be logged in the analytics database 554 for further analysis and processing as will be explained below. The action processor 550 may initiate an automatic data correction including but not limited to deleting the data, labeling it, or predicting its true value without user intervention. Alternatively, the action processor 550 may forward a suggested action to the alert processor 552 and in turn the alert user interface 548 to request user approval (e.g., by user 570) before the action performed. If the action is approved the processor would forward the request to the correction processor 556. If it is not approved the action would be cancelled. Further, the action processor 554 may have to coordinate the processing of the ordered chain of detection rules. For example, if the ordered sequence of detection rules includes both detection rules configured for automatic action and detection rules configured for suggested action requiring user approval, the alert processor 550 may delay processing (e.g., forwarding requests to the correction processor 556) of the automatic actions until the suggested actions have been approved or rejected by the user.

The alert processor 552 manages the presentation of information to the user to minimize the demand on the attention of the users but at the same time establishing or building user trust in the system by displaying the right information to the user via the alert user interface 548 at the right time. Examples of the types of alerts include but are not limited to performed actions, suggested actions, and notification actions. Performed actions are actions that have been completed automatically and do not require user intervention. Suggested actions are actions that require user approval before they are completed. Notifications actions are informational actions presented to the user. The alert processor 552 may employ different techniques to minimize user attention and build trust. For example, the alert processor 552 may show only suggested actions originating from a detection rule with a high severity attribute until these actions have been processed by the user. Alternatively, the alert processor 552 may at the time of commissioning (e.g., when users are new to the system and trust is low) show all alerts to the user in an effort to establish trust and understanding, then over time hide, for example, automatic actions. The decision of the alert processor on what information to display is a dynamic process that may be determined by analyzing user behavior. For example, if there are no automatic actions this may suggest that user confidence is low and more information may be displayed. Conversely, if most actions are automatic this may suggest user confidence is high and less information is displayed to the user to minimize demands on their attention. These decisions may be supported by data collected in the analytics database 554

The analytics database 554 collects data including but not limited to data errors and anomalies, the actions of the system, and user interactions. These data may be used for multiple supporting purposes including but not limited to managing user attention and trust as was outlined above and recommending actions to the sensor network (via the alert processor 552 and alert user interface 540) on the operations of their sensor networks. For example, repeated corrections applied to a specific sensor time series or a specific category of sensors may indicate a problem with the sensor or sensors. The sensor network operator could address these problems there by preventing data errors from occurring. Alternatively, data from the analytics database 554 could reveal that users are repeatedly approving the same suggested action. In this scenario the system could recommend to the user that the action be made automatic via the alert processor 552 and alert user interface 548 to reduce demands on their attention The correction processor 556 receives the ordered sequence of actions from the action processor 550 and may correct, delete, label, or otherwise augment the data to improve or characterize the truthfulness and correctness of the sensor data. The correction processor 556 may leverage a prediction engine 560 in this process. The correction processor 556 transforms the sequence of actions into specific augmentations to the data. For example, it may first delete erroneous data points and then use various methods to interpolate and/or extrapolate the missing data, such as linear or spline regression or more complex autoregressive or machine learning models. Alternatively, the correction processor 556 may determine there is insufficient good data to perform interpolation and may instead use the prediction engine 560 to predict the data. The correction processor 556 may determine there is insufficient information from any source to correct the data and instead label the data as unusable or delete it entirely. The correction processor may also estimate the uncertainty of the data and provide upper and lower confidence ranges as labels. This may be done with or without correcting the data. Yet another method the correction processor 556 may apply is to fit the time series sensor data to any corresponding field visit data within the period of data being corrected. Multiple methods may be applied to do this including shifting or drifting the sensor data so that it passes through the field visit data or using specific error models that describe sensor fouling processes such as biological fouling. After the correction processor 556 has completed modifying the data it may write the data back to the sensor database 412.

The prediction engine 560 combines various sources of information and data to predict or estimate the true value of a sensor time series for a specific period of time. It may also estimate the uncertainty and confidence bounds. The prediction processor 562 may use univariate (e.g., use only the target time series sensor data) or multivariate (e.g., use multiple time series sensor data) modeling approaches. These techniques include but are not limited to linear or spline interpolation, linear and non-linear regression, autoregressive models, and machine learning models such as LSTM (long short-term memory) models, autoencoder models, and/or CNN (convolutional neural network) models. The prediction processor 562 may use data from the sensor database 412 (e.g., time series data from a redundant sensor), the non-federated system 414 (e.g., time series data from a sensor that is geographically close but from another customer), or any third party data 564 (e.g., meteorological data provided by the National Oceanic and Atmospheric Administration (NOAA)). Once the prediction has been computed the prediction processor 562 integrates the prediction into the target time series, ensuring the transition from the target time series to the newly predictive values is smooth and does not introduce discontinuities or other artificial artifacts of data processing. For example, prediction processor 562 may shift the predictive values up or down in magnitude to align with the valid target time series at the start and end of the period of time series data being predicted. Alternatively it may use linear or non-linear interpolation to estimate a smooth transition without discontinuities from the target time series to the prediction.

Figure 6:
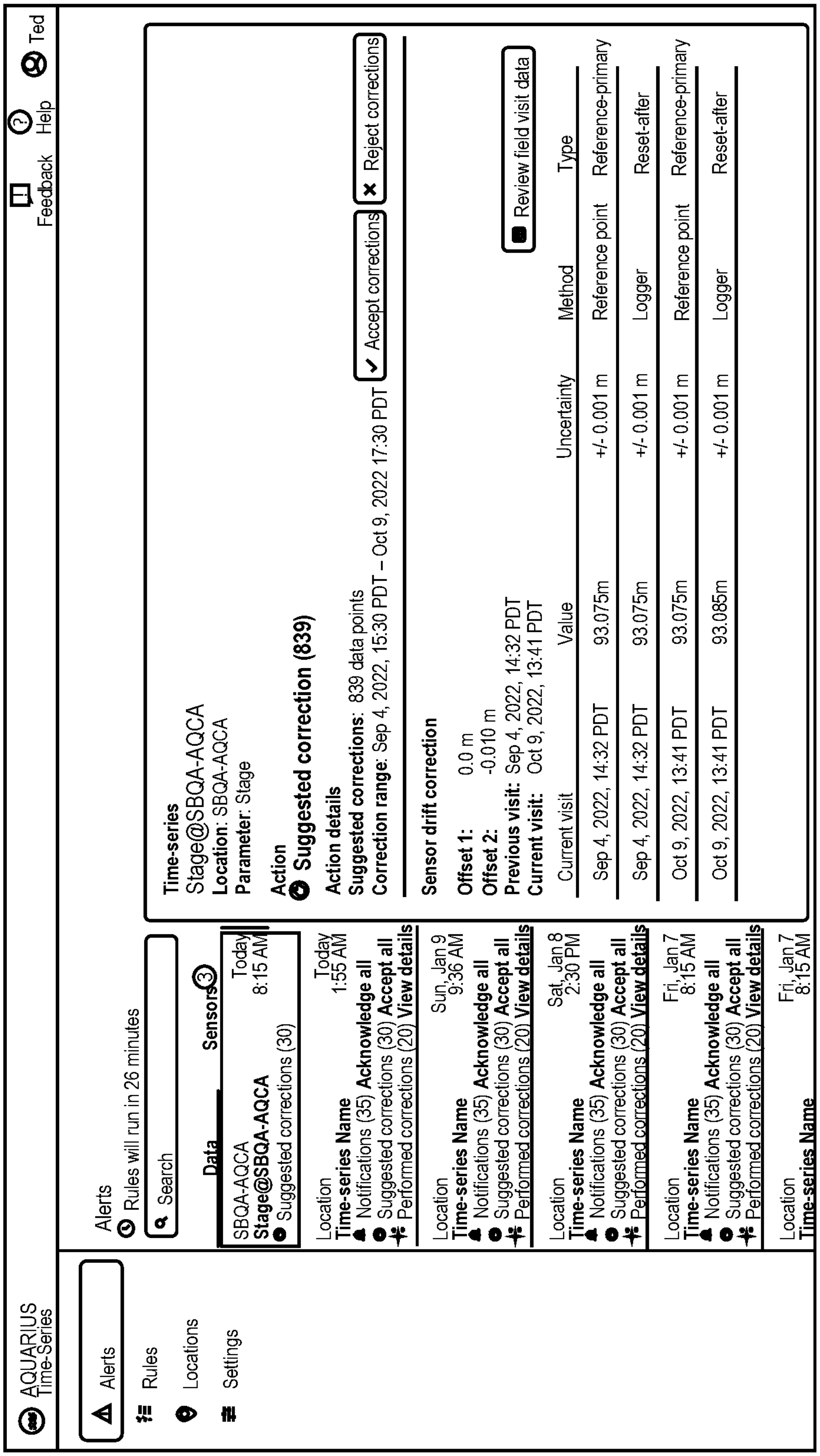
FIGS. 6-12 are example interactive user interfaces for using various functionality of the disclosed system, according to some arrangements.
Figure 7:
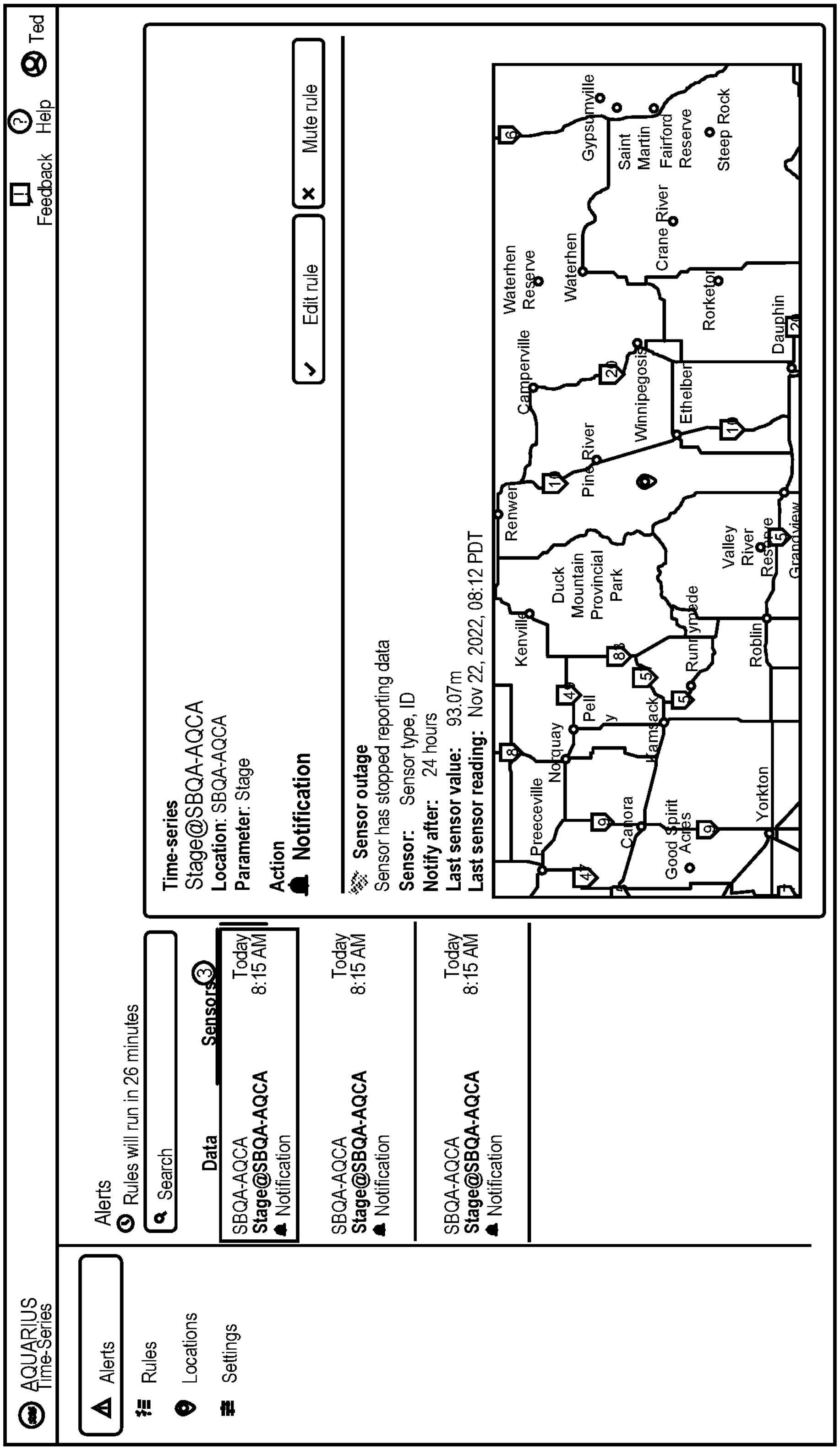

FIG. 6 provides an example user interface with a view of selectable alerts, with a data view (FIG. 6) and a sensor view (FIG. 7). In FIG. 6, for a selected alert, the user interface provides suggested corrections. In FIG. 6, the selected alert indicates that 839 data points would be corrected. The user interface also indicates that the correction is to compensate for sensor drift. FIG. 7 provides a listing of three sensors affected. Additional information about each sensor can be reviewed by selecting the sensor. In FIG. 7, the user interface indicates that the selected sensor is experiencing an outage because the sensor has stopped reporting data. A map includes an icon at the center showing the location of the selected sensor.

Figure 8:
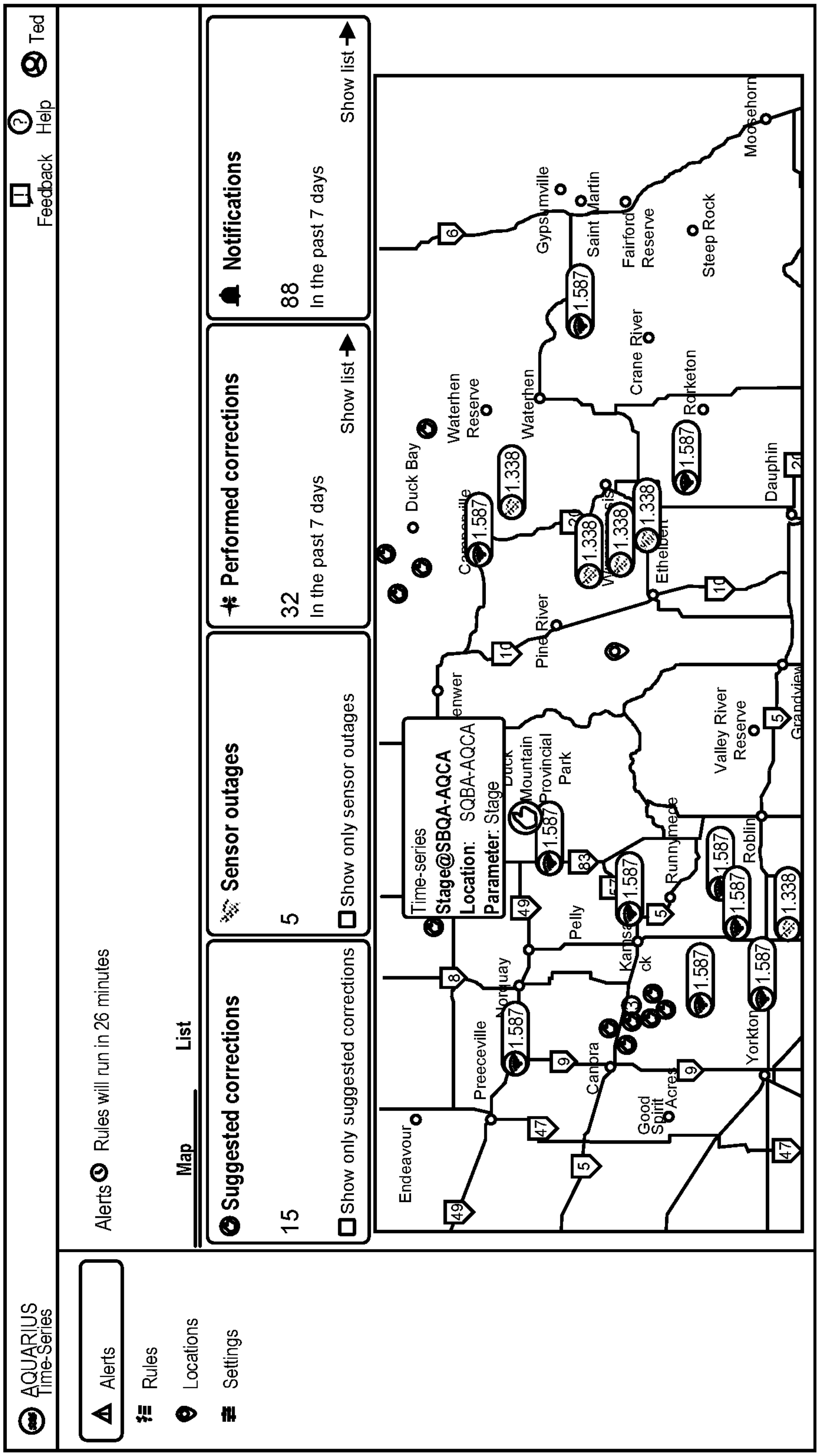
Figure 9:
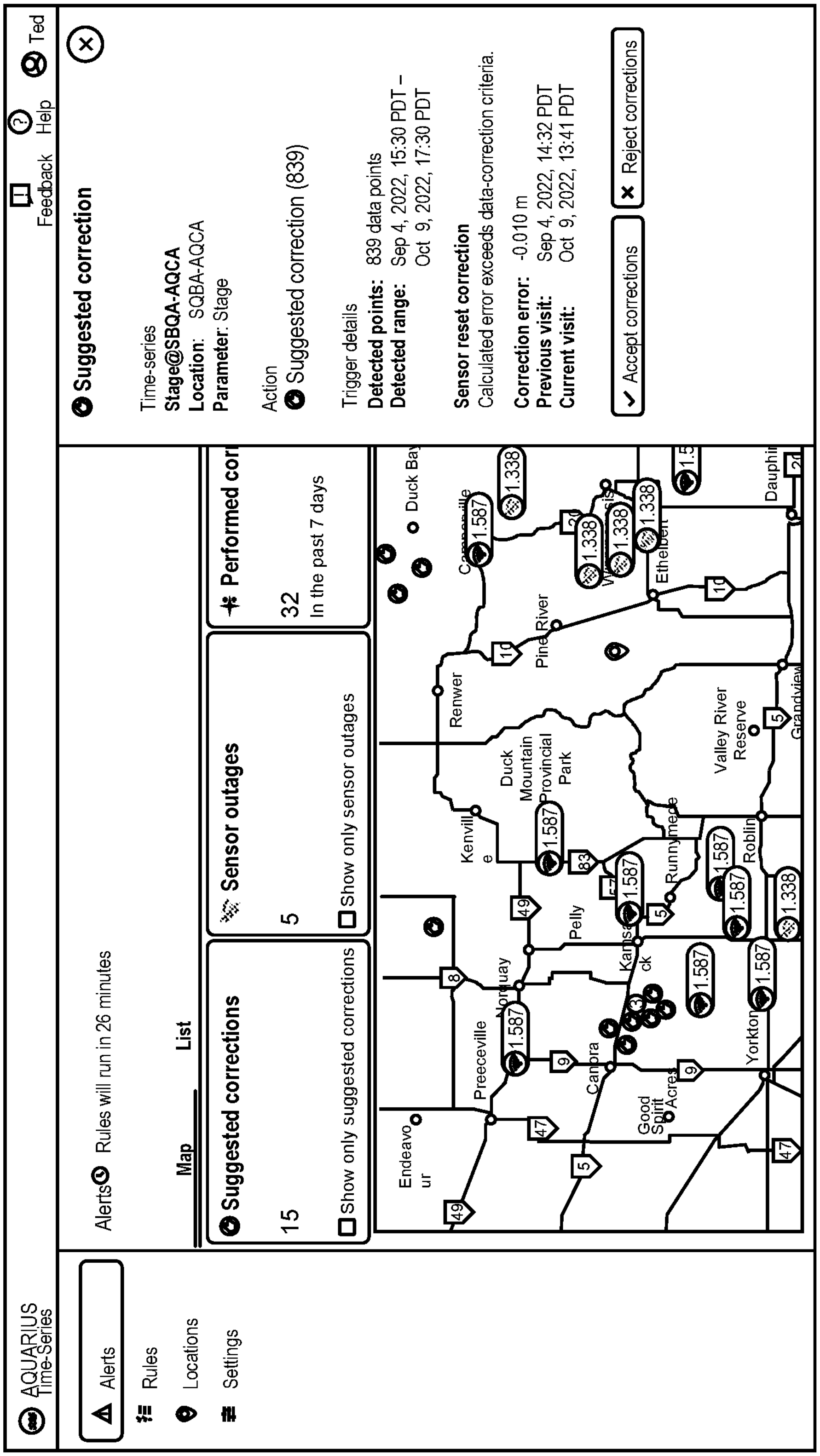
Figure 10:
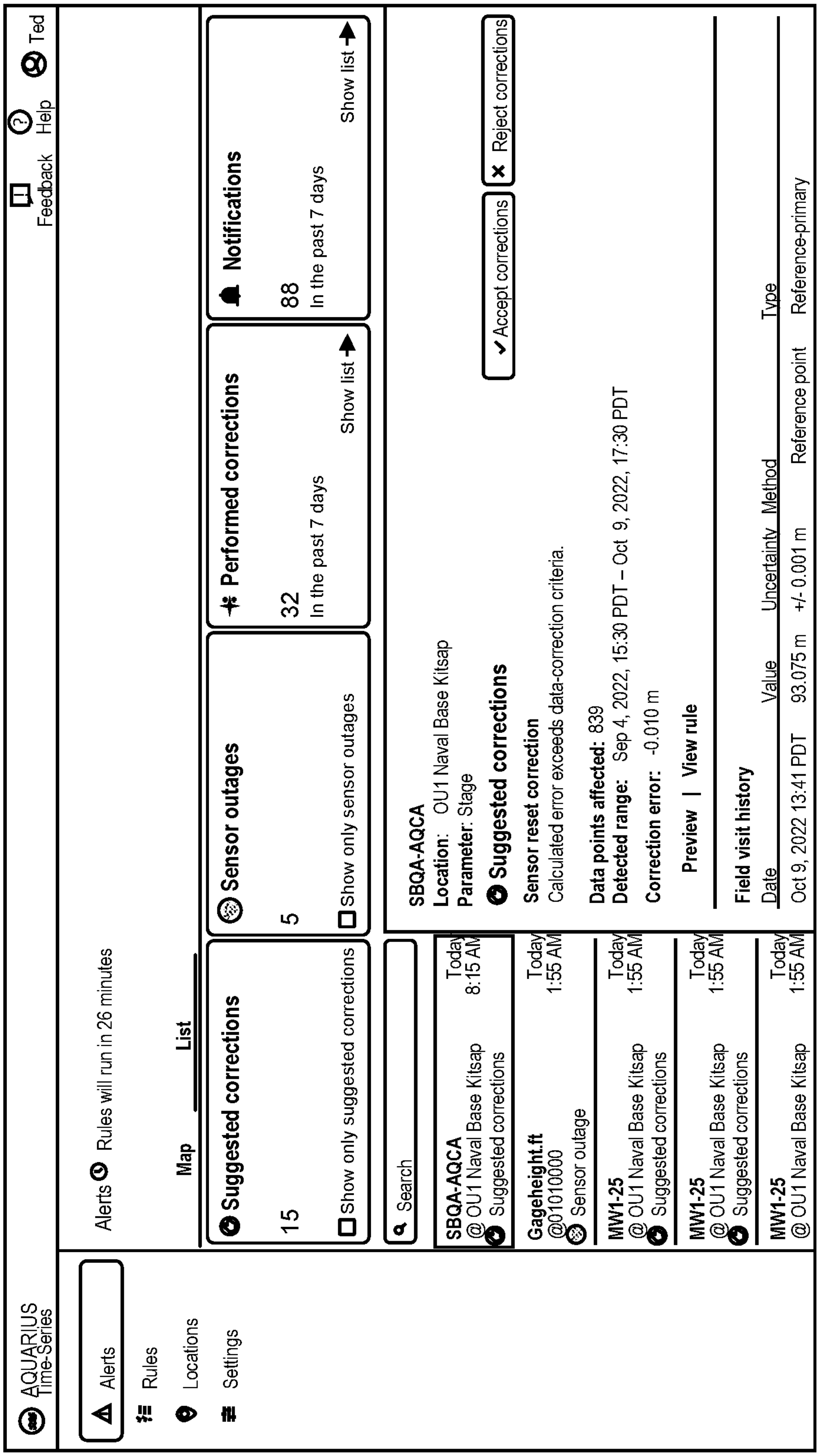

FIG. 8 provides a "map view" for alerts, with an indication that there are 15 suggested corrections and 5 sensor outages, with 32 corrections performed and 88 notifications in the past 7 days. Selectable icons in the map correspond to locations and statuses (e.g., online/reporting sensors or offline/not reporting sensors experiencing an outage). In FIG. 9, a window with information about a selected time series is shown, indicating that there are suggested corrections and allowing the user to choose to "accept corrections" or "reject corrections." FIG. 10 provides a list view for alerts, with selectable time series provided in a list.

Figure 11:
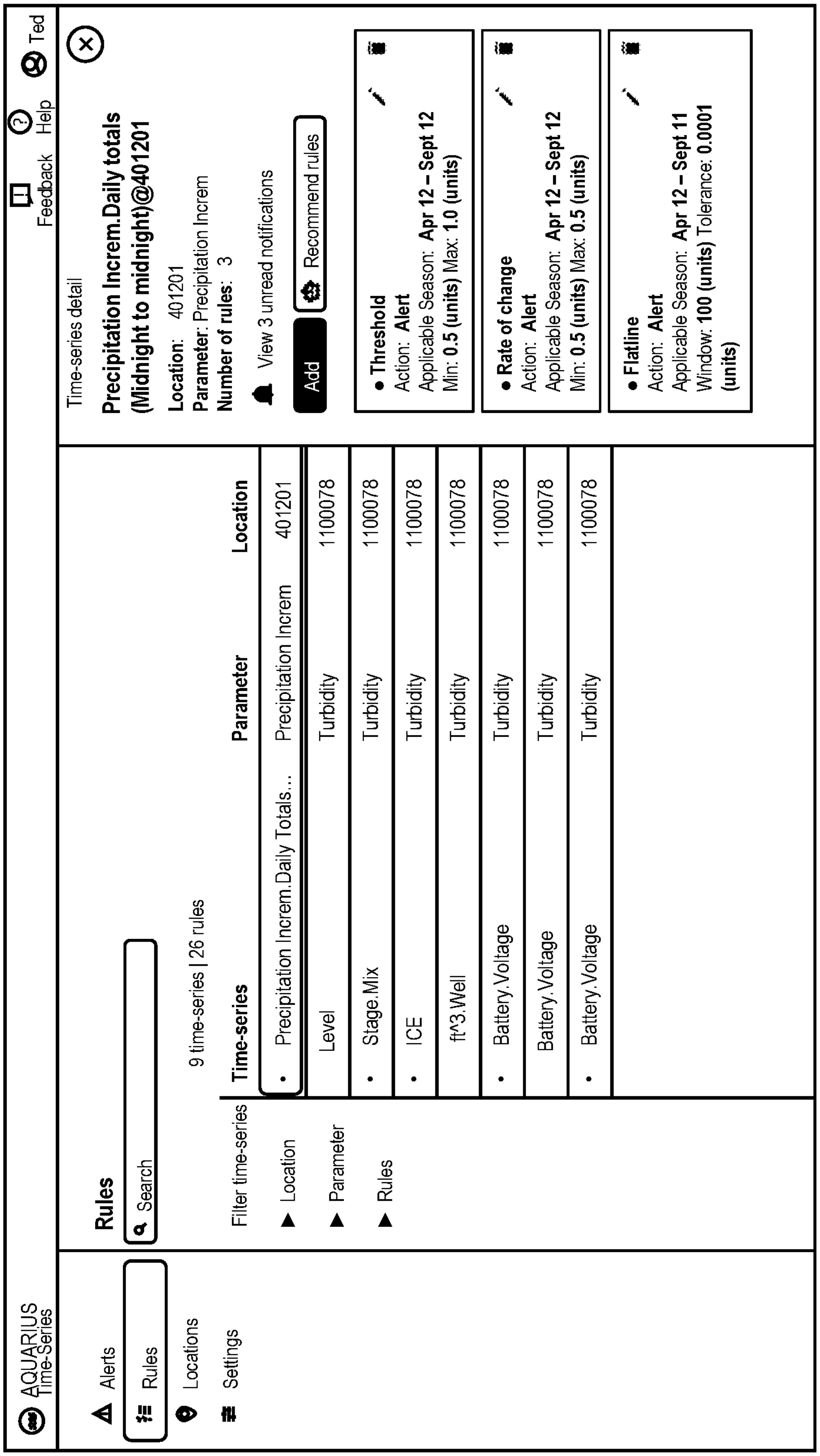
Figure 12:
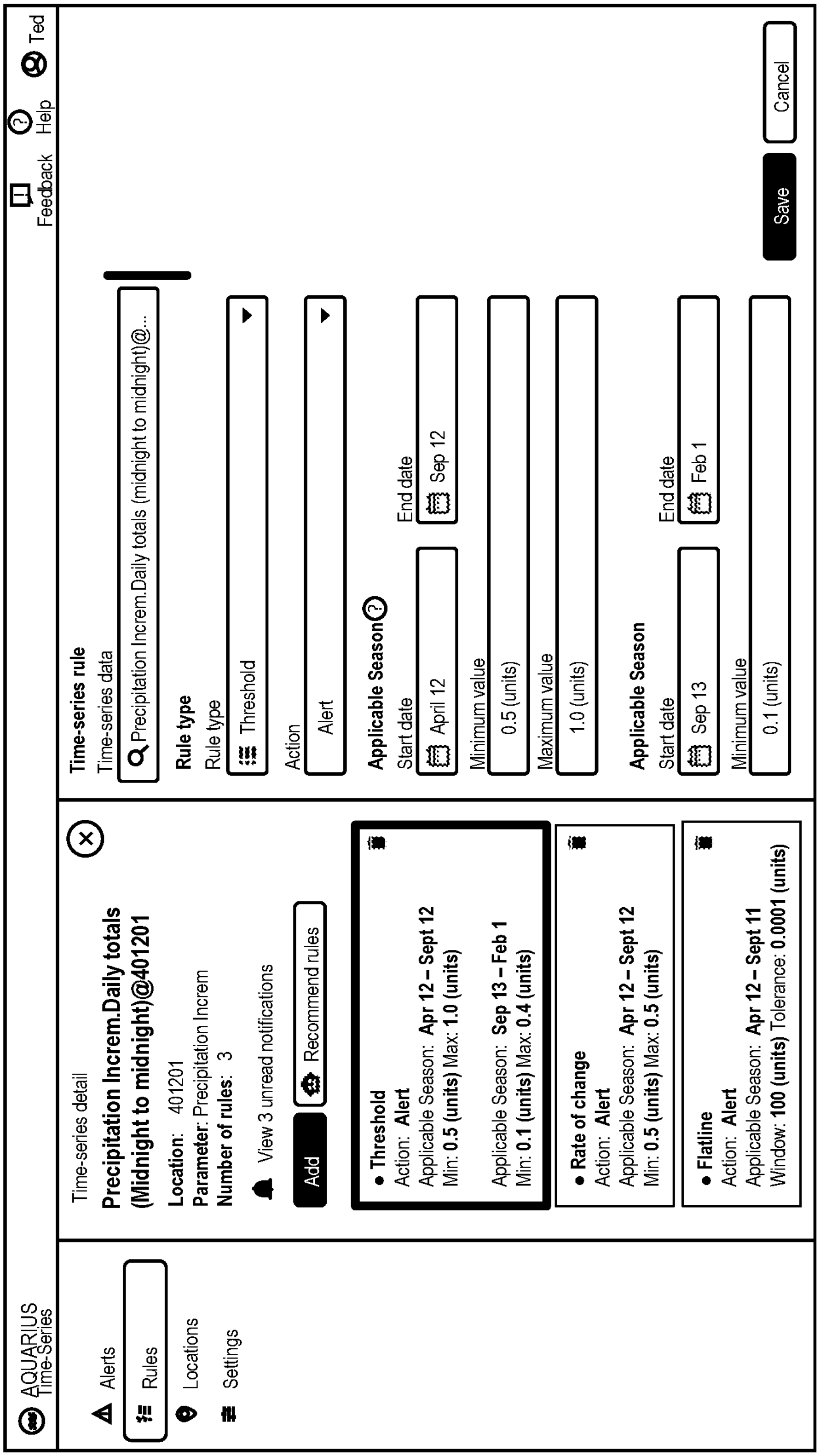

FIG. 11 provides a selectable list of time series. Each detection rule identifies time series, parameter, and location. For a selected time series, the user interface of FIG. 11 allows the user to update or tune any previously recommended detection rules as well as add different types of detection rules. FIG. 12 provides a user interface for adding detection rules, with a threshold-based detection rule selected. Once the detection rule has been configured, it can be "saved" for use in correcting sensor data.

Features and Aspects of Various Example Embodiments

Trusted Automation: In some cases, the system may need to directly encourage or prompt users to adopt automation. As full automation is often not a realistic first step, the goal and challenge are to support users in the transition to automation, much of which boils down to establishing trust. Trust can be established through: visibility (e.g., users able to see what the system has done via an audit trail), understandability (e.g., users are able to understand results such as an anomaly being detected by a heuristic rule); and control (e.g., users remain in the loop and approve actions (e.g., a suggested correction) until they feel comfortable fully automating an action). Also, automation may surface in different areas of the system, from configuration (see Rule Recommendation) to core operations such as detecting and correcting data.

Detection Rules and Recommendations: Detecting data errors and anomalies and then deleting/suppressing and/or labeling (e.g., grading) them may be a first step in the data cleaning process. Less complex detection rules (e.g., level threshold, rate of change, etc.) when used in combination (e.g., a specifically ordered sequence of detection rules) can be similarly effective as more complex machine learning models or processes for detecting certain data errors. Further, they may be more easily understood by users and thus more trusted. To encourage adoption by users, a detection rule recommendation solution that can automatically configure an optimal set of less complex detection rules for a time series can be provided, thereby shifting the intelligence from the processes that detect the errors to the recommendation of detection rules. Once users are consistently maximizing the effectiveness of the less complex detection rules, then more complex detection rules may be introduced.

A goal of example embodiments of the disclosed approach is to generate an ordered sequence of detection rules to detect errors or anomalies. Detection rule ordering (e.g., a specific order in which detection rules are to be run) can be important. Detection rules may be generated from existing historical labelled data of the same time series, from corrupted historical labelled data of the same time series, and/or from historical labelled data from other time series (e.g., from other customers).

Data Estimation and Correction: Estimating missing or erroneous data that has been deleted, and/or correcting erroneous data, may be the second steps in the data-cleaning process. This may be deemed to be the correction step. The overarching goal would be to leverage relevant information to develop predictions of the true value, potentially with confidence bounds. Corrections may leverage high-accuracy, in-situ field visit data to adjust the continuous time series data based on a standard error model. Estimation of missing data may employ both univariate and multivariate approaches including regression.

Analytics: Use cases for analytics may include: increase in automatically corrected data points; build trust and enable behavior change by allowing users to audit and review system actions and gain confidence in automation; review and enforce data quality standards (e.g., ensure all pH time series have level threshold setup); monitor and diagnose issues with sensor networks (e.g., identifying sensors that require the most corrections); and/or monitor and diagnose issues with organizational QA/QC practices.

Continuous Improvement: The system may actively engage users to improve performance and increase value over time. For example, less complex detection rules could be further tuned based on user acceptance and rejection of suggested corrections, or users could be promoted to fully automate suggested corrections they regularly just accept.

With reference to FIGS. 4 and 5, when onboarding a new target system, detection rule generation may involve collecting unrealistic values or other organization standard detection rules from the system (422). These may be used to generate course level threshold detection rules that can be applied based on the parameter (feature), for example, pH, DO, etc., and thus may not require any historical data.

Historical time series data may also be collected from the target system (412). The collected data may be used to generate a sequence of detection rules for all time series on which detection rules are to be executed (418), such as level threshold, rate of change threshold, and flatline. These detection rules may support operating on a specific season or period of time within a year. Detection rules may be checked by a data science team and saved to file (424).

With respect to field visit detection rules, less complex detection rules that describe how to correct continuous time series data or drift and fouling (e.g., by shifting the data up or down) may be applied. With respect to application setup, a target system may be provisioned and connected to the a time series database (412).

Recommended detection rules may be uploaded in bulk to the rules database (428) to a software application as suggested corrections (e.g., actions will not automatically be performed). In some embodiments, detection rules to address unrealistic data may be uploaded as automatic corrections.

Users may log into the software application and select the locations they are interested in (which may not be all locations/time series data being processed). Users may set up additional detection rules, and could be allowed to add, update, and/or remove detection rules as needed. Detection rules may be evaluated periodically (e.g., every hour) (542). As data is streamed into the system, users may monitor an alerts page (552) for the actions resulting from the detection rules on a regular basis (e.g., hourly, daily, or weekly) and review and accept or reject recommended actions (548/550). Users may change status of detection rules from suggested to automatic, thus requiring less user attention or time.

Sample implementations are disclosed below, in order to represent illustrative examples, which may be further modified, combined, constrained, etc. according to the entirety of this disclosure.

Embodiment A1: A method comprising: collecting, by one or more processors of a computing system, (i) first sensor data comprising a time series of data obtained from a first set of one or more sensors, and (ii) auxiliary data corresponding at least in part to the first sensor data; generating, by the one or more processors, a first set of one or more detection rules for modifying the first sensor data by analyzing at least the first sensor data and the auxiliary data; determining, by the one or more processors, that the first set of one or more detection rules is applicable to second sensor data from at least one of (i) the first set of one or more sensors or (ii) a second set of one or more sensors; and modifying, by the one or more processors, the second sensor data by applying the first set of one or more detection rules to the second sensor data to refine or supplement the second sensor data.

Embodiment A2: The method of Embodiment A1, further comprising: receiving, by the one or more processors, via one or more input devices of one or more computing devices, at least one of (i) one or more changes to modified second sensor data, or (ii) one or more labels applied to the modified second sensor data; and modifying, by the one or more processors, the first set of one or more detection rules based on at least one of (i) the one or more changes to the modified second sensor data or (ii) the one or more labels applied to the modified second sensor data to obtain a second set of one or more detection rules.

Embodiment A3: The method of Embodiment A2, further comprising modifying, by applying the second set of one or more detection rules, at least one of (i) the modified second sensor data, or (ii) third sensor data obtained from at least one of (i) the first set of one or more sensors, (ii) the second set of one or more sensors, or (iii) a third set of one or more sensors.

Embodiment A4: The method of any of Embodiments A1-A3, wherein the method further comprises: presenting, by the one or more processors, via one or more output devices of one or more computing devices, the first set of one or more detection rules, wherein presenting the first set of one or more detection rules comprises presenting, by the one or more processors, via the one or more output devices of the one or more computing devices, an indication of how the second sensor data would be modified through application of the first set of one or more detection rules, and receiving, by the one or more processors, via one or more input devices of the one or more computing devices, approval of the application of the set of one or more detection rules to the second sensor data, wherein the first set of one or more detection rules is applied to modify the second sensor data in response to receiving the approval.

Embodiment A5: The method of Embodiment A4, wherein the indication includes a description, definition, summary, or representation of at least a portion of the first set of one or more detection rules.

Embodiment A6: The method of Embodiment A4, wherein the indication includes a description, definition, summary, or representation of a least a portion of the second sensor data based on application of the first set of one or more detection rules.

Embodiment A7: The method of any of Embodiments A1-A6, wherein the method further comprises receiving, by the one or more processors, via the one or more input devices of the one or more computing devices, a user supplied modification of the first set of one or more detection rules, and wherein the application of the first set of one or more detection rules to modify the second sensor data includes application of the user supplied modification.

Embodiment A8: The method of any of Embodiments A1-A7, wherein modifying second sensor data includes applying the first set of one or more detection rules to generate data missing for one or more points in time.

Embodiment A9: The method of any of Embodiments A1-A8, wherein the auxiliary data is indicative of how the first sensor data has been modified by one or more users.

Embodiment A10: The method of any of Embodiments A1-A9, wherein the auxiliary data comprises a modified time series of sensor data corresponding at least in part to the first sensor data, wherein at least a subset of the first sensor data is modified or deleted.

Embodiment A11: The method of any of Embodiments A1-A10, wherein the auxiliary data comprises data from at least one sensor that is not included in the first set of one or more sensors.

Embodiment A12: The method of any of Embodiments A1-A11, wherein the auxiliary data comprises at least one of (i) one or more labels applied to the first sensor data, or (ii) metadata corresponding at least in part to the first sensor data.

Embodiment A13: The method of any of Embodiments A1-A12, wherein analyzing the first sensor data and the auxiliary data comprises: selecting, by the one or more processors, based at least in part on the auxiliary data, a subset of the first sensor data; and determining, by the one or more processors, one or more classes of modifications made to the subset of the first sensor data.

Embodiment A14: The method of any of Embodiments A1-A13, wherein generating the first set of one or more detection rules comprises formulating an expression according to one or more classes of modifications.

Embodiment A15: The method of any of Embodiments A1-A14, wherein a subset of the first sensor data is selected based at least in part on one or more characteristics of one or more sensors of the first set of one or more sensors.

Embodiment A16: The method of any of Embodiments A1-A15, wherein one or more characteristics corresponds to one or more locations of the first set of one or more sensors.

Embodiment A17: The method of any of Embodiments A1-A16, wherein one or more characteristics correspond to a body of water from which sensor readings are collected using one or more sensors.

Embodiment A18: The method of any of Embodiments A1-A17, wherein one or more sensors in the first set of one or more sensors measure conditions in one or more accumulations of water.

Embodiment A19: The method of any of Embodiments A1-A18, wherein the first set of one or more detection rules comprises a plurality of detection rules, and wherein generating the first set of one or more detection rules comprises generating a sequential order in which the plurality of detection rules are to be applied to sensor data.

Embodiment A20: The method of any of Embodiments A1-A19, wherein a sequential order for application of detection rules is based on at least one of an attribute or an action of each generated detection rule.

Embodiment A21: The method of any of Embodiments A1-A20, wherein a plurality of detection rules is generated, and wherein the method further comprises applying generated detection rules in a sequential order, the sequential order determined based on at least one of the generated detection rules and/or on sensor data to which the generated detection rules are to be applied.

Embodiment B1: A computing system comprising one or more processing circuits configured to: collect (i) first sensor data comprising a time series of data obtained from a first set of one or more sensors, and (ii) auxiliary data corresponding at least in part to the first sensor data; generate a first set of one or more detection rules for modifying the first sensor data by analyzing at least the first sensor data and the auxiliary data; determine that the first set of one or more detection rules is applicable to second sensor data from at least one of (i) the first set of one or more sensors or (ii) a second set of one or more sensors; and modify the second sensor data by applying the first set of one or more detection rules to the second sensor data to refine or supplement the second sensor data.

Embodiment B2: The computing system of Embodiment B1, the one or more processing circuits configured to: receive, via one or more input devices of one or more computing devices, at least one of (i) one or more changes to the modified second sensor data, or (ii) one or more labels applied to the modified second sensor data; and modify, by the one or more processors, the first set of detection rules based on at least one of (i) the one or more changes to the modified second sensor data or (ii) the one or more labels applied to the modified sensor data to obtain a second set of one or more detection rules.

Embodiment B3: The computing system of either Embodiment B1 or B2, wherein analyzing at least the first sensor data and the auxiliary data comprises: selecting, based at least in part on the auxiliary data, a subset of the first sensor data; and determining, by the one or more processors, one or more classes of modifications made to the subset of the first sensor data.

Embodiment C1: A method comprising: collecting, by one or more processors of a computing system, first sensor data comprising a time series of data obtained from a first set of one or more sensors; generating or identifying, by the one or more processors, one or more detection rules applicable to the first sensor data, for refining or supplementing the first sensor data, by analyzing at least a portion of the first sensor data; presenting, by the one or more processors, via one or more output devices of one or more computing devices, an indication of how at least a portion of the first sensor data would be refined or supplemented through application of the one or more detection rules; receiving, by the one or more processors, via one or more input devices of the one or more computing devices, approval of the application of the one or more detection rules to the first sensor data; and applying, by the one or more processors, the one or more detection rules to the first sensor data to refine or supplement the first sensor data.

Embodiment C2: The method of Embodiment C1, further comprising collecting, by the one or more processors, auxiliary data corresponding at least in part to the first sensor data.

Embodiment C3: The method of either Embodiment C1 or C2, wherein the one or more detection rules are generated based at least on auxiliary data by: selecting, by the one or more processors, based on auxiliary data, a subset of the first sensor data; and determining, by the one or more processors, one or more classes of modifications made to the subset of the first sensor data.

Embodiment C4: The method of any of Embodiments C1-C3, wherein generating the one or more detection rules comprises formulating, by the one or more processors, an expression according to one or more classes of modifications.

Embodiment C5: The method of any of Embodiments C1-C4, wherein a subset of the first sensor data is selected based on one or more characteristics of one or more of the set of one or more sensors from which the first sensor data was obtained.

Embodiment C6: The method of claim Embodiment C5, wherein the one or more characteristics corresponds to one or more locations of the one or more of the set of one or more sensors from which the first sensor data was obtained.

Embodiment C7: The method of claim Embodiment C5, wherein the one or more characteristics correspond to one or more bodies of water from which sensor readings are collected using the set of one or more sensors from which the first sensor data was obtained.

Embodiment C8: The method of any of Embodiments C1-C7, further comprising collecting, by the one or more processors, a set of metadata corresponding to the first sensor data.

Embodiment C9: The method of any of Embodiments C1-C8, wherein the one or more detection rules are further generated based on a set of metadata.

Embodiment C10: The method of any of Embodiments C1-C9, further comprising collecting, by the one or more processors, auxiliary data comprising a transformation of at least part of the first sensor data.

Embodiment C11: The method of any of Embodiments C1-C10, further comprising collecting, by the one or more processors, auxiliary data comprising a modified time series of sensor data corresponding at least in part to the first sensor data, wherein at least a subset of the first sensor data is modified or deleted.

Embodiment C12: The method of any of Embodiments C1-C11, further comprising collecting auxiliary data that is indicative of changes made to the first sensor data.

Embodiment C13: The method of any of Embodiments C1-C12, further comprising collecting auxiliary data comprising data from at least one sensor that is not included in the first set of one or more sensors.

Embodiment C14: The method of any of Embodiments C1 to C13, wherein the indication includes a description, definition, summary, or representation of at least a portion of the one or more the detection rules.

Embodiment C15: The method of any of Embodiments C1-C14, wherein the indication includes a description, definition, summary, or representation of a least a portion of the second sensor data based on application of the one or more detection rules.

Embodiment C16: The method of any of Embodiments C1-C15, wherein the method further comprises receiving, by the one or more processors, via one or more input devices of the one or more computing devices, a user supplied modification of the one or more detection rules, and wherein the application of the one or more detection rules to modify the second sensor data includes application of the user supplied modification.

Embodiment C17: The method of any of Embodiments C1-C16, further comprising receiving, by the one or more processors, via one or more input devices of the one or more computing devices, at least one of (i) one or more modifications to the first sensor data, or (ii) one or more labels applied to the first sensor data.

Embodiment C18: The method of any of Embodiments C1-C17, further comprising generating, by the one or more processors, one or more detection rules based on at least one of (i) one or more modifications to the first sensor data or (ii) one or more labels applied to the first sensor data.

Embodiment C19: The method of any of Embodiments C1-C18, collecting, by the one or more processors, second sensor data obtained from a second set of one or more sensors.

Embodiment C20: The method of any of Embodiments C1-C19, further comprising: presenting, by the one or more processors, via one or more output devices of one or more computing devices, an indication of how second sensor data would be at least one of modified or labeled through application of the one or more detection rules.

Embodiment C21: The method of any of Embodiments C1-C20, further comprising: receiving, by the one or more processors, via one or more input devices of the one or more computing devices, approval of application of the one or more detection rules to second sensor data.

Embodiment C22: The method of any of Embodiments C1-C21, further comprising applying, by the one or more processors, one or more detection rules to second sensor data to refine or supplement the second sensor data.

Embodiment C23: The method of any of Embodiments C1-C22, wherein generating the one or more detection rules comprises: selecting, by the one or more processors, based on one or more modifications to the first sensor data or one or more labels applied to the first sensor data, a subset of the first sensor data; determining, by the one or more processors, one or more classes of modifications made to the subset of the first sensor data; and formulating, by the one or more processors, an expression according to the one or more classes of modifications.

Embodiment C24: The method of any of Embodiments C1-C23, further comprising presenting, by the one or more processors, via one or more output devices of one or more computing devices, an indication of how second sensor data would be at least one of modified or labeled through application of the one or more detection rules.

Embodiment C25: The method of any of Embodiments C1-C24, further comprising receiving, by the one or more processors, via one or more input devices of the one or more computing devices, a user supplied modification of the set of one or more detection rules, wherein the application of the one or more detection rules to modify second sensor data includes application of the user supplied modification.

Embodiment C26: The method of any of Embodiments C1-C25, wherein generating the one or more detection rules comprises: selecting, by the one or more processors, based on one or more modifications to the first sensor data or one or more labels applied to the first sensor data, a subset of the first sensor data; and determining, by the one or more processors, one or more classes of modifications made to the subset of the time series of first sensor data.

Embodiment C27: The method of any of Embodiments C1-C26, wherein a subset of the first sensor data is selected based on one or more characteristics of the set of one or more sensors.

Embodiment C28: The method of Embodiment C27, wherein the one or more characteristics corresponds to at least one of (i) one or more locations of the first set of one or more sensors, or (ii) one or more bodies of water from which sensor readings are collected using the first set of one or more sensors.

Embodiment C29: The method of any of Embodiments C1-C28, wherein applying the one or more detection rules generates data missing from the first sensor data for one or more points in time.

Embodiment C30: The method of any of Embodiments C1-C29, wherein the one or more detection rules comprises a plurality of detection rules, and wherein generating or identifying the plurality of detection rules comprises generating or identifying a sequential order in which the plurality of detection rules are to be applied to the first sensor data.

Embodiment C31: The method of any of Embodiments C1-C30, wherein a sequential order in which the plurality of detection rules are to be applied to sensor data is based on at least one of an attribute or an action of each of the plurality of detection rules.

Embodiment C32: The method of any of Embodiments C1-C31, wherein the one or more detection rules comprises a plurality of detection rules, the method further comprising applying the plurality of detection rules to the first sensor data according to the sequential order.

Embodiment D1: A computing system comprising one or more processing circuits configured to: collect (i) first sensor data comprising a time series of data obtained from a first set of one or more sensors; generate or identify one or more detection rules applicable to the first sensor data, for refining or supplementing the first sensor data, by analyzing at least a portion of the first sensor data; present, via one or more output devices of one or more computing devices, an indication of how at least a portion of the first sensor data would be modified through application of the one or more detection rules; receive, via one or more input devices of the one or more computing devices, approval of the application of the one or more detection rules to the first sensor data; and apply the one or more detection rules to the first sensor data to refine or supplement the first sensor data.

Embodiment D2: The computing system of Embodiment D1, the one or more processing circuits further configured to communicate with at least one of: (A) a second computing system to collect at least one of (i) the time series of first sensor data or (ii) the modification data; or (B) the set of sensors.

Embodiment D3: The computing system of Embodiment D1 or D2, the one or more processing circuits further configured to collect auxiliary data corresponding at least in part to the first sensor data.

Embodiment D4: The computing system of any of Embodiments D1-D3, wherein the one or more detection rules are generated further based on the auxiliary data by: selecting, by the one or more processing circuits, based on the auxiliary data, a subset of the first sensor data; and determining, by the one or more processing circuits, one or more classes of modifications made to the subset of the first sensor data.

Embodiment E1: A method comprising: collecting, by one or more processors of a computing system, first sensor data comprising a time series of data obtained from a set of one or more sensors; receiving, by the one or more processors, via one or more input devices of the one or more computing devices, at least one of (i) one or more modifications to the time series of first sensor data, or (ii) one or more labels applied to the first sensor data; generating, by the one or more processors, one or more detection rules based on at least one of (i) the one or more modifications to the time series of first sensor data or (ii) the one or more labels applied to the first sensor data; collecting, by the one or more processors, second sensor data obtained from a set of one or more sensors; presenting, by the one or more processors, via one or more output devices of one or more computing devices, an indication of how the second sensor data would be at least one of modified or labeled through application of the one or more detection rules; receiving, by the one or more processors, via one or more input devices of the one or more computing devices, approval of the application of the one or more detection rules to the second sensor data; and applying, by the one or more processors, the one or more detection rules to the second sensor data to refine or supplement the second sensor data.

Embodiment E2: The method of Embodiment E1, wherein collecting the first sensor data comprises accessing, by the one or more processors, the time series of first sensor data via at least one of (i) a second computing system or (ii) the set of one or more sensors.

Embodiment E3: The method of either Embodiment E1 or E2, wherein generating the one or more detection rules comprises: selecting, by the one or more processors, based on the one or more modifications or the one or more labels, a subset of the time series of first sensor data; and determining, by the one or more processors, one or more classes of modifications made to the subset of the time series of first sensor data.

Embodiment E4: The method of Embodiment E3, wherein generating the one or more detection rules comprises formulating an expression according to the one or more classes of modifications.

Embodiment E5: The method of Embodiment E4, wherein the indication includes a description, definition, summary, or representation of a least a portion of the second sensor data based on application of the set of one or more detection rules.

Embodiment E6: The method of Embodiment E4, wherein the method further comprises receiving, by the one or more processors, via one or more input devices of the one or more computing devices, a user supplied modification of the set of one or more detection rules, and wherein the application of the first set of one or more detection rules to modify the second sensor data includes application of the user supplied modification.

Embodiment E7: The method of Embodiment E3, wherein the subset of the time series of first sensor data is selected based on one or more characteristics of the set of one or more sensors.

Embodiment E8: The method of Embodiment E7, wherein the one or more characteristics corresponds to one or more locations of the set of one or more sensors.

Embodiment E9: The method of Embodiment E7, wherein the one or more characteristics correspond to one or more bodies of water from which sensor readings are collected using the set of one or more sensors.

Embodiment E10: The method of any of Embodiments E1-E9, further comprising collecting a set of metadata corresponding at least in part to the first sensor data in the time series of first sensor data.

Embodiment E11: The method of Embodiment E10, wherein the one or more detection rules are further generated based on the set of metadata.

Embodiment E12: The method of any of Embodiments E1-E11, wherein the one or more modifications comprise a modified time series of sensor data corresponding to the first sensor data, wherein at least a subset of the first sensor data is modified or deleted.

Embodiment E13: The method of any of Embodiments E1-E12, further comprising presenting, by the one or more processors, via the one or more output devices, a definition of the one or more the detection rules.

Embodiment E14: The method of any of Embodiments E1-E13, wherein the indication includes a description, definition, summary, or representation of at least a portion of the set of one or more detection rules.

Embodiment F1: A computing system comprising one or more processing circuits configured to: collect first sensor data comprising a time series of data obtained from a set of one or more sensors; receive, via one or more input devices of the one or more computing devices, at least one of (i) one or more modifications to the time series of first sensor data, or (ii) one or more labels applied to the first sensor data; generate one or more detection rules based on at least one of (i) the one or more modifications to the time series of first sensor data or (ii) the one or more labels applied to the first sensor data; collect second sensor data obtained from a set of one or more sensors;

present, via one or more output devices of one or more computing devices, an indication of how the second sensor data would be at least one of modified or labeled through application of the one or more detection rules; receive, via one or more input devices of the one or more computing devices, approval of the application of the one or more detection rules to the second sensor data; and apply the one or more detection rules to the second sensor data to refine or supplement the second sensor data.

Embodiment F2: The computing system of Embodiment F1, the one or more processing circuits configured to communicate with at least one of: (A) a second computing system to collect at least one of (i) the time series of first sensor data, (ii) the one or more modifications, or (iii) the one or more labels applied to the first sensor data; or (B) the set of sensors.

Embodiment F3: The computing system of either Embodiment F1 or F2, wherein the one or more processing circuits collect the sensor data by accessing the time series of first sensor data via at least one of (i) a second computing system or (ii) the set of sensors.

Embodiment F4: The computing system of any of Embodiments F1-F3, wherein generating the one or more detection rules comprises: selecting, based on the one or more modifications or the one or more labels, a subset of the time series of first sensor data; and determining one or more classes of modifications made to the subset of the time series of first sensor data.

Embodiment G1: A method comprising: receiving, by one or more processors of a computing system, via one or more input devices of one or more computing devices, auxiliary data corresponding to a set of first modified sensor data, wherein the auxiliary data includes at least one of (i) one or more changes to the set of first modified sensor data, or (ii) one or more labels applicable to the set of first modified sensor data, the set of first modified sensor data having been obtained or created at least in part by application of a first set of one or more detection rules to a set of first sensor data from a first set of one or more sensors; generating, by the one or more processors, a second set of one or more detection rules at least in part by modifying the first set of one or more detection rules based at least in part on the auxiliary data; collecting, by the one or more processors, a set of second sensor data obtained from the first set of one or more sensors or from a second set of one or more sensors; determining, by the one or more processors, that the second set of one or more detection rules is applicable to the set of second sensor data; and modifying, by the one or more processors, the set of second sensor data by applying the second set of one or more detection rules to the set of second sensor data.

Embodiment G2: The method of Embodiment G1, further comprising generating, by the one or more processors, the first set of one or more detection rules.

Embodiment G3: The method of either Embodiment G1 or G2, wherein the first set of one or more detection rules is generated based in part on at least one of (i) first sensor data from the first set of one or more sensors, or (ii) prior sensor data from the first set of one or more sensors or from another set of one or more sensors.

Embodiment G4: The method of any of Embodiments G1-G3, wherein the first set of one or more detection rules is generated based on prior auxiliary data that includes at least one of (i) one or more changes to the prior sensor data, or (ii) one or more labels applicable to the prior sensor data.

Embodiment G5: The method of any of Embodiments G1-G4, further comprising generating the first set of one or more detection rules, wherein generating the first set of one or more detection rules comprises analyzing the prior sensor data and the prior auxiliary data by: selecting, by the one or more processors, based on the auxiliary data, a subset of the prior sensor data; and determining, by the one or more processors, one or more classes of modifications made to the subset of the prior sensor data.

Embodiment G6: The method of any of Embodiments G1-G5, further comprising generating the first set of one or more detection rules, wherein generating the first set of detection rules comprises formulating an expression according to the one or more classes of modifications.

Embodiment G7: The method of any of Embodiments G1-G6, wherein a subset of the prior sensor data is selected based on one or more characteristics of the first set of one or more sensors or the another set of one or more sensors.

Embodiment G8: The method of Embodiment G7, wherein the one or more characteristics corresponds to one or more locations of the first set of one or more sensors or the another set of one or more sensors.

Embodiment G9: The method of any of Embodiments G1-G8, wherein the modifying the set of second sensor data comprises applying the second set of one or more detection rules to generate data missing for one or more points in time.

Embodiment G10: The method of any of Embodiments G1-G9, wherein the modifying the set of second sensor data comprises applying the second set of one or more detection rules to refine the set of second sensor data.

Embodiment G11: The method of any of Embodiments G1-G10, wherein the auxiliary data comprises metadata corresponding to the first set of modified sensor data.

Embodiment G12: The method of any of Embodiments G1-G11, wherein the auxiliary data is indicative of how the first set of modified sensor data was modified by one or more users.

Embodiment G13: The method of any of Embodiments G1-G12, wherein the auxiliary data comprises data from at least one sensor that is not included in either of the first set of one or more sensors or the second set of one or more sensors.

Embodiment G14: The method of any of Embodiments G1-G13, further comprising presenting, by the one or more processors, via one or more output devices, the second set of one or more detection rules.

Embodiment G15: The method of any of Embodiments G1-G14, further comprising presenting, by the one or more processors, via one or more output devices, the second set of one or more detection rules, wherein presenting the second set of one or more detection rules comprises presenting, by the one or more processors, via the one or more output devices of the one or more computing devices, an indication of how the first set of one or more detection rules is modified to obtain the second set of one or more detection rules.

Embodiment G16: The method of any of Embodiments G1-G15, further comprising presenting, by the one or more processors, via one or more output devices, the second set of one or more detection rules, wherein presenting the second set of one or more detection rules comprises presenting, by the one or more processors, via the one or more output devices of the one or more computing devices, a description, definition, summary, or representation of at least a portion of the second set of one or more detection rules.

Embodiment G17: The method of any of Embodiments G1-G16, further comprising presenting, by the one or more processors, via one or more output devices, the second set of one or more detection rules, wherein presenting the second set of one or more detection rules comprises presenting, by the one or more processors, via the one or more output devices of the one or more computing devices, an indication of how applying the second set of one or more detection rules to the set of second sensor data modifies the set of second sensor data.

Embodiment G18. The method of any of Embodiments G1-G17, wherein the first set of one or more sensors and the second set of one or more sensors are sensors detecting conditions of one or more bodies of water.

Embodiment G19. The method of any of Embodiments G1-G18, wherein the second set of one or more detection rules comprises a second plurality of detection rules, and wherein generating the second plurality of detection rules comprises generating a second sequential order in which the second plurality of detection rules are to be applied to the set of second sensor data.

Embodiment G20. The method of any of Embodiments G1-G19, wherein a sequential order in which detection rules are applied is based on at least one of an attribute or an action of the detection rules.

Embodiment G21. The method of any of Embodiments G1-G20, wherein the second set of one or more detection rules comprises a second plurality of detection rules, the method further comprising applying the second plurality of detection rules to the set of second sensor data according to a second sequential order.

Embodiment H1: A computing system comprising one or more processing circuits configured to: receive, via one or more input devices of one or more computing devices, auxiliary data corresponding to a set of first modified sensor data, wherein the auxiliary data includes at least one of (i) one or more changes to the set of first modified sensor data, or (ii) one or more labels applicable to the set of first modified sensor data, the set of first modified sensor data having been obtained or created at least in part by application of a first set of one or more detection rules to a set of first sensor data from a first set of one or more sensors; generate a second set of one or more detection rules at least in part by modifying the first set of one or more detection rules based at least in part on the auxiliary data; collect a set of second sensor data obtained from the first set of one or more sensors or from a second set of one or more sensors; determine that the second set of one or more detection rules is applicable to the set of second sensor data; and modify the set of second sensor data by applying the second set of one or more detection rules to the set of second sensor data.

Embodiment H2: The computing system of Embodiment H1, the one or more processing circuits further configured to generate the first set of one or more detection rules based in part on (i) prior sensor data from the first set of one or more sensors or from another set of one or more sensors, and (ii) prior auxiliary data that includes at least one of (i) one or more changes to the prior sensor data, or (ii) one or more labels applicable to the prior sensor data.

Embodiment H3: The computing system of either Embodiment H1 or H2, the one or more processing circuits further configured to presenting, via one or more output devices, the second set of one or more detection rules, wherein presenting the second set of one or more detection rules comprises at least one of: presenting, via the one or more output devices of the one or more computing devices, a first indication of how the first set of one or more detection rules is modified to obtain the second set of one or more detection rules; presenting, via the one or more output devices of the one or more computing devices, a description, definition, summary, or representation of at least a portion of the second set of one or more detection rules; or presenting, via the one or more output devices of the one or more computing devices, a second indication of how applying the second set of one or more detection rules to the set of second sensor data modifies the set of second sensor data.

Embodiment I1: A method comprising: collecting, by one or more processors of a computing system, (i) first sensor data comprising a time series of data obtained from a first set of one or more sensors, and (ii) auxiliary data corresponding at least in part to the first sensor data; generating, by the one or more processors, a plurality of detection rules for modifying the first sensor data by analyzing at least the first sensor data and the auxiliary data, and a sequential order for application of the plurality of detection rules; determining, by the one or more processors, that the first set of one or more detection rules is applicable to second sensor data from at least one of (i) the first set of one or more sensors or (ii) a second set of one or more sensors; and modifying, by the one or more processors, the second sensor data by applying, according to the sequential order, the plurality of detection rules to the second sensor data to refine or supplement the second sensor data.

Embodiment J1: A method comprising: collecting, by one or more processors of a computing system, first sensor data comprising a time series of data obtained from a first set of one or more sensors; generating or identifying, by the one or more processors, by analyzing at least a portion of the first sensor data, a plurality of detection rules applicable to the first sensor data and a sequential order for application of the plurality of detection rules; presenting, by the one or more processors, via one or more output devices of one or more computing devices, an indication of how at least a portion of the first sensor data would be refined or supplemented through application of the plurality of detection rules; receiving, by the one or more processors, via one or more input devices of the one or more computing devices, approval of the application of the plurality of detection rules to the first sensor data; and applying, by the one or more processors, according to the sequential order, the plurality of detection rules to the first sensor data to refine or supplement the first sensor data.

Embodiment K1. A method comprising: receiving, by one or more processors of a computing system, via one or more input devices of one or more computing devices, auxiliary data corresponding to a set of first modified sensor data, wherein the auxiliary data includes at least one of (i) one or more changes to the set of first modified sensor data, or (ii) one or more labels applicable to the set of first modified sensor data, the set of first modified sensor data having been obtained or created at least in part by application of a first plurality of detection rules to a set of first sensor data from a first set of one or more sensors; generating, by the one or more processors, a second plurality of detection rules at least in part by modifying the first plurality of detection rules based at least in part on the auxiliary data; collecting, by the one or more processors, a set of second sensor data obtained from the first set of one or more sensors or from a second set of one or more sensors; determining, by the one or more processors, that the second set of one or more detection rules is applicable to the set of second sensor data; and modifying, by the one or more processors, the set of second sensor data by applying, according to a first sequential order or a second sequential order, the second plurality of detection rules to the set of second sensor data.

Embodiment K2. The method of Embodiment K1, wherein the first plurality of detection rules is applied in the first sequential order, and the second plurality of detection rules is applied in the second sequential order.

Embodiment K3: The method of either Embodiment K1 or K2, further comprising generating at least one of (i) the first sequential order applicable to the first plurality of detection rules or (ii) the second sequential order applicable to the second plurality of detection rules.

Embodiment L1: A method performed by any of the above computing systems and/or computing devices.

Embodiment M1: A computing system or a computing device comprising one or more processors configured to perform any of the above methods.

Embodiment N1: A non-transitory computer readable medium comprising instructions configured to cause one or more processors to perform any of the above methods.

Various functionality of the disclosed approach can be realized, in various embodiments, using any combination of software and hardware, such as dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa. "Software" refers generally to sequences of instructions that, when executed by processing units cause systems/devices (or portions thereof) to perform various operations, thus defining one or more specific machine embodiments that execute and perform the operations of the software programs. The instructions can be stored as firmware residing in read-only memory and/or program code stored in non-volatile storage media that can be read into volatile working memory for execution by processing units. Software can be implemented as a single program or a collection of separate programs or program modules that interact as desired. From local storage (or non-local storage), processing units can retrieve program instructions to execute and data to process in order to execute various operations described above.

The embodiments described herein have been described with reference to drawings. The drawings illustrate certain details of specific embodiments that provide the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112 (f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory).

Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be provided as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a “circuit” as described herein may include components that are distributed across one or more locations.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. It is understood that all such variations are within the scope of the disclosure. Likewise, software and web implementations of the present disclosure may be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A method comprising:

collecting, by one or more processors of a computing system, (i) first sensor data comprising time series raw sensor data obtained from a first set of one or more water sensors located at a first geographic location, and (ii) auxiliary data corresponding at least in part to the first sensor data;

generating, by the one or more processors, a first set of one or more detection rules for modifying the first sensor data by analyzing at least the first sensor data and the auxiliary data, wherein the first set of one or more detection rules includes a calibration factor;

determining, by the one or more processors, that the first set of one or more detection rules is applicable to second sensor data comprising time series raw sensor data from at least one of (i) the first set of one or more water sensors or (ii) a second set of one or more water sensors located at a second geographic location;

presenting, by the one or more processors, via one or more output devices of one or more computing devices, a graphical map including the first geographic location of the first set of one or more water sensors, the second geographic location of the second set of one or more water sensors, and an indication of how the second sensor data would be modified through application of the first set of one or more detection rules;

receiving, by the one or more processors, via one or more input devices of the one or more computing devices, a user supplied selection of the second geographic location and modification of the first set of one or more detection rules and the calibration factor; and in response to the user supplied selection of the second geographic location, modifying, by the one or more processors, the second sensor data by applying the first set of one or more detection rules and the user supplied modification to the second sensor data to refine or supplement the second sensor data and convert the second sensor data into calibrated sensor data by applying the calibration factor.

2. The method of claim 1, further comprising:

receiving, by the one or more processors, via the one or more input devices of the one or more computing devices, at least one of (i) one or more changes to modified second sensor data, or (ii) one or more labels applied to the modified second sensor data; and modifying, by the one or more processors, the first set of one or more detection rules based on at least one of (i) the one or more changes to the modified second sensor data or (ii) the one or more labels applied to the modified second sensor data to obtain a second set of one or more detection rules.

3. The method of claim 2, further comprising modifying, by applying the second set of one or more detection rules, at least one of (i) the modified second sensor data, or (ii) third sensor data obtained from at least one of (i) the first set of one or more water sensors, (ii) the second set of one or more water sensors, or (iii) a third set of one or more water sensors.

4. The method of claim 1, wherein the method further comprises:

receiving, by the one or more processors, via the one or more input devices of the one or more computing devices, approval of the application of the first set of one or more detection rules to the second sensor data, wherein the first set of one or more detection rules is applied to modify the second sensor data in response to receiving the approval.

5. The method of claim 1, wherein the indication includes a description, definition, summary, or representation of at least a portion of the first set of one or more detection rules.

6. The method of claim 1, wherein the indication includes a description, definition, summary, or representation of a least a portion of the second sensor data based on application of the first set of one or more detection rules.

7. The method of claim 1, wherein the modifying includes applying the first set of one or more detection rules to generate data missing for one or more points in time.

8. The method of claim 1, wherein the auxiliary data is indicative of how the first sensor data has been modified by one or more users.

9. The method of claim 1, wherein the auxiliary data comprises a modified time series of sensor data corresponding at least in part to the first sensor data, wherein at least a subset of the first sensor data is modified or deleted.

10. The method of claim 1, wherein the auxiliary data comprises data from at least one sensor that is not included in the first set of one or more water sensors.

11. The method of claim 1, wherein the auxiliary data comprises at least one of (i) one or more labels applied to the first sensor data, or (ii) metadata corresponding at least in part to the first sensor data.

12. The method of claim 1, wherein analyzing the first sensor data and the auxiliary data comprises:

selecting, by the one or more processors, based at least in part on the auxiliary data, a subset of the first sensor data; and determining, by the one or more processors, one or more classes of modifications made to the subset of the first sensor data.

13. The method of claim 12, wherein generating the first set of one or more detection rules comprises formulating an expression according to the one or more classes of modifications.

14. The method of claim 12, wherein the subset of the first sensor data is selected based at least in part on one or more characteristics of one or more water sensors of the first set of one or more water sensors.

15. The method of claim 14, wherein the one or more characteristics corresponds to one or more locations of the first set of one or more water sensors.

16. The method of claim 14, wherein the one or more characteristics correspond to a body of water from which sensor readings are collected using the one or more water sensors.

17. The method of claim 1, wherein the first set of one or more detection rules comprises a plurality of detection rules, and wherein generating the first set of one or more detection rules comprises generating a sequential order in which the plurality of detection rules are to be applied to sensor data.

18. The method of claim 17, wherein the sequential order is based on at least one of an attribute or an action of each of the plurality of detection rules.

19. The method of claim 17, further comprising applying the plurality of detection rules to the second sensor data according to the sequential order.

20. A computing system comprising one or more processing circuits further configured to:

collect (i) first sensor data comprising time series raw sensor data obtained from a first set of one or more water sensors located at a first geographic location, and (ii) auxiliary data corresponding at least in part to the first sensor data;

generate a first set of one or more detection rules for modifying the first sensor data by analyzing at least the first sensor data and the auxiliary data, wherein the first set of one or more detection rules includes a calibration factor;

determine that the first set of one or more detection rules is applicable to second sensor data comprising time series raw sensor data from at least one of (i) the first set of one or more water sensors or (ii) a second set of one or more water sensors located at a second geographic location;

present, by the one or more processing circuits, via one or more output devices of one or more computing devices, a graphical map including the first geographic location of the first set of one or more water sensors, the second geographic location of the second set of one or more water sensors, and an indication of how the second sensor data would be modified through application of the first set of one or more detection rules;

receive, by the one or more processing circuits, via one or more input devices of the one or more computing devices, a user supplied selection of the second geographic location and modification of the first set of one or more detection rules and the calibration factor; and in response to the user supplied selection of the second geographic location, modify the second sensor data by applying the first set of one or more detection rules and the user supplied modification to the second sensor data to refine or supplement the second sensor data and convert the second sensor data into calibrated sensor data by applying the calibration factor.

21. The computing system of claim 20, the one or more processing circuits further configured to:

receive, via the one or more input devices of the one or more computing devices, at least one of (i) one or more changes to the modified second sensor data, or (ii) one or more labels applied to the modified second sensor data; and modify, by the one or more processing circuits, the first set of one or more detection rules based on at least one of (i) the one or more changes to the modified second sensor data or (ii) the one or more labels applied to the modified second sensor data to obtain a second set of one or more detection rules.

22. The computing system of claim 20, wherein analyzing at least the first sensor data and the auxiliary data comprises:

selecting, based at least in part on the auxiliary data, a subset of the first sensor data; and determining, by the one or more processing circuits, one or more classes of modifications made to the subset of the first sensor data.

* * * * *